(12) United States Patent
Suzuki

(10) Patent No.: US 10,216,320 B2
(45) Date of Patent: Feb. 26, 2019

(54) DISPLAY DEVICE AND INPUT DEVICE

(71) Applicant: Japan Display Inc., Tokyo (JP)

(72) Inventor: Takafumi Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 134 days.

(21) Appl. No.: 15/354,410

(22) Filed: Nov. 17, 2016

(65) Prior Publication Data
US 2017/0160863 A1 Jun. 8, 2017

(30) Foreign Application Priority Data

Dec. 4, 2015 (JP) .................................. 2015-237258

(51) Int. Cl.
*G06F 3/041* (2006.01)
*G06F 3/044* (2006.01)
*G02F 1/1333* (2006.01)
*G02F 1/1343* (2006.01)

(52) U.S. Cl.
CPC ........ *G06F 3/0416* (2013.01); *G02F 1/13338* (2013.01); *G02F 1/134336* (2013.01); *G06F 3/044* (2013.01); *G06F 3/0412* (2013.01); *G02F 1/13439* (2013.01); *G06F 2203/04108* (2013.01)

(58) Field of Classification Search
CPC ........... G02F 1/13338; G02F 1/134336; G02F 1/13439; G06F 2203/04108; G06F 3/0412; G06F 3/0416; G06F 3/044
See application file for complete search history.

(56) References Cited

U.S. PATENT DOCUMENTS

| | | | | |
|---|---|---|---|---|
| 2010/0309162 A1* | 12/2010 | Nakanishi | ............... | G06F 3/044 345/174 |
| 2014/0292712 A1* | 10/2014 | Koito | ................... | G06F 3/0416 345/174 |
| 2015/0220204 A1* | 8/2015 | Noguchi | ............... | G06F 3/0412 345/174 |
| 2015/0235607 A1* | 8/2015 | Nakanishi | ............ | G09G 3/3696 345/174 |
| 2015/0309636 A1* | 10/2015 | Kurasawa | ............... | G06F 3/044 345/173 |
| 2015/0370401 A1* | 12/2015 | Mizuhashi | .......... | G02F 1/13338 345/174 |
| 2017/0097731 A1* | 4/2017 | Noguchi | ............... | G06F 3/0416 |
| 2017/0115790 A1* | 4/2017 | Kurasawa | ............. | G06F 3/0412 |

FOREIGN PATENT DOCUMENTS

JP 2015-121958 7/2015

* cited by examiner

*Primary Examiner* — Dmitriy Bolotin
(74) *Attorney, Agent, or Firm* — K&L Gates LLP

(57) ABSTRACT

A display device includes: a display panel having a front surface and a back surface and displaying an image on the front surface; a plurality of detection electrodes overlapping the display panel when seen in a plan view; and a shield electrode overlapping the display panel when seen in a plan view. The shield electrode is arranged on a side opposite to a side of the front surface with respect to the plurality of detection electrodes. Based on electrostatic capacitance of the shield electrode, proximity or contact of an object to the front surface is detected, and based on electrostatic capacitance of each of the plurality of detection electrodes, a position of the object is detected.

20 Claims, 25 Drawing Sheets

DISPLAY DEVICE AND INPUT DEVICE

CROSS-REFERENCE TO RELATED APPLICATION

The present application claims priority from Japanese Patent Application No. 2015-237258 filed on Dec. 4, 2015, the content of which is hereby incorporated by reference into this application.

TECHNICAL FIELD OF THE INVENTION

The present invention relates to a display device and an input device.

BACKGROUND OF THE INVENTION

In recent years, there is a technique where an input device called a touch panel or a touch sensor is attached to a display surface of a display device and an input position is detected and output when an input operation is performed by bringing an input tool such as a finger or a touch pen into contact with the touch panel.

An example of the detection methods for detecting a contact position where a finger or the like contacts a touch panel serving as such an input device is an electrostatic capacitance detection method. In a touch panel using the electrostatic capacitance detection method, a plurality of capacitive elements each including a detection electrode are provided in the surface of the touch panel. The input position is detected by utilizing the fact that electrostatic capacitance of the capacitive element changes when an input operation is performed by bringing an input tool such as a finger or a touch pen into contact with the capacitive element.

For example, Japanese Patent Application Laid-Open Publication No. 2015-121958 (Patent Document 1) discloses a technique where an input device includes a detection electrode, a plurality of driving electrodes arranged so as to intersect with the detection electrode and each forming electrostatic capacitance with the detection electrode, and a shield electrode arranged in a lower layer further away from an operating surface than the detection electrode and the plurality of driving electrodes.

SUMMARY OF THE INVENTION

In such an input device, before a finger coordinate detection process of detecting a position of a finger, that is, coordinates of a finger, is performed as a detection mode, a finger proximity detection process of detecting proximity or contact of the finger may be performed as a standby mode. In addition, in the finger coordinate detection process, electrostatic capacitance of each of the plurality of detection electrodes is individually detected by sequentially switching the plurality of detection electrodes one by one or in groups and connecting the detection electrode or the detection electrodes to a detection circuit.

However, in the finger proximity detection process, in a case in which electrostatic capacitance of each of the plurality of detection electrodes is detected by switching the plurality of detection electrodes in groups and connecting the plurality of detection electrodes to the detection circuit in the same manner as in the finger coordinate detection process, there is a problem that a longer time is taken for the detection process or power consumption increases.

In contrast, in a case in which the plurality of detection electrodes are partly selected in groups in order to shorten the time taken for the detection process or a waiting time for repeating the detection process is prolonged, a detection error may occur.

The present invention is made in order to solve the problem of a conventional technique as described above. The purpose of the present invention is to provide an input device and a display device capable of preventing or suppressing occurrence of a detection error while reducing a time taken for a finger proximity detection process and reducing power consumption in the finger proximity detection process performed as a standby mode before a finger coordinate detection process as a detection mode.

The typical ones of the inventions disclosed in the present application will be briefly described as follows.

A display device as a mode of the present invention includes: a display panel including a first surface on a first side, and a second surface on a side opposite to the first side, the display panel displaying an image on the first surface; a plurality of first electrodes overlapping the display panel when seen in a plan view; and a second electrode overlapping the display panel when seen in a plan view. The second electrode is arranged on the side opposite to the first side with respect to the plurality of first electrodes. Proximity or contact of an object to the first surface is detected based on electrostatic capacitance of the second electrode, and a position of the object brought in proximity to or into contact with the first surface is detected based on electrostatic capacitance of each of the plurality of first electrodes.

An input device as a mode of the present invention includes: a substrate including a first surface on a first side, and a second surface on a side opposite to the first side; a plurality of first electrodes overlapping the substrate when seen in a plan view; and a second electrode overlapping the substrate when seen in a plan view. The second electrode is arranged on the side opposite to the first side with respect to the plurality of first electrodes. Proximity or contact of an object to the first surface is detected based on electrostatic capacitance of the second electrode, and a position of the object brought in proximity to or into contact with the first surface is detected based on electrostatic capacitance of each of the plurality of first electrodes.

BRIEF DESCRIPTIONS OF THE DRAWINGS

DESCRIPTIONS OF THE PREFERRED EMBODIMENTS

Figure 1:
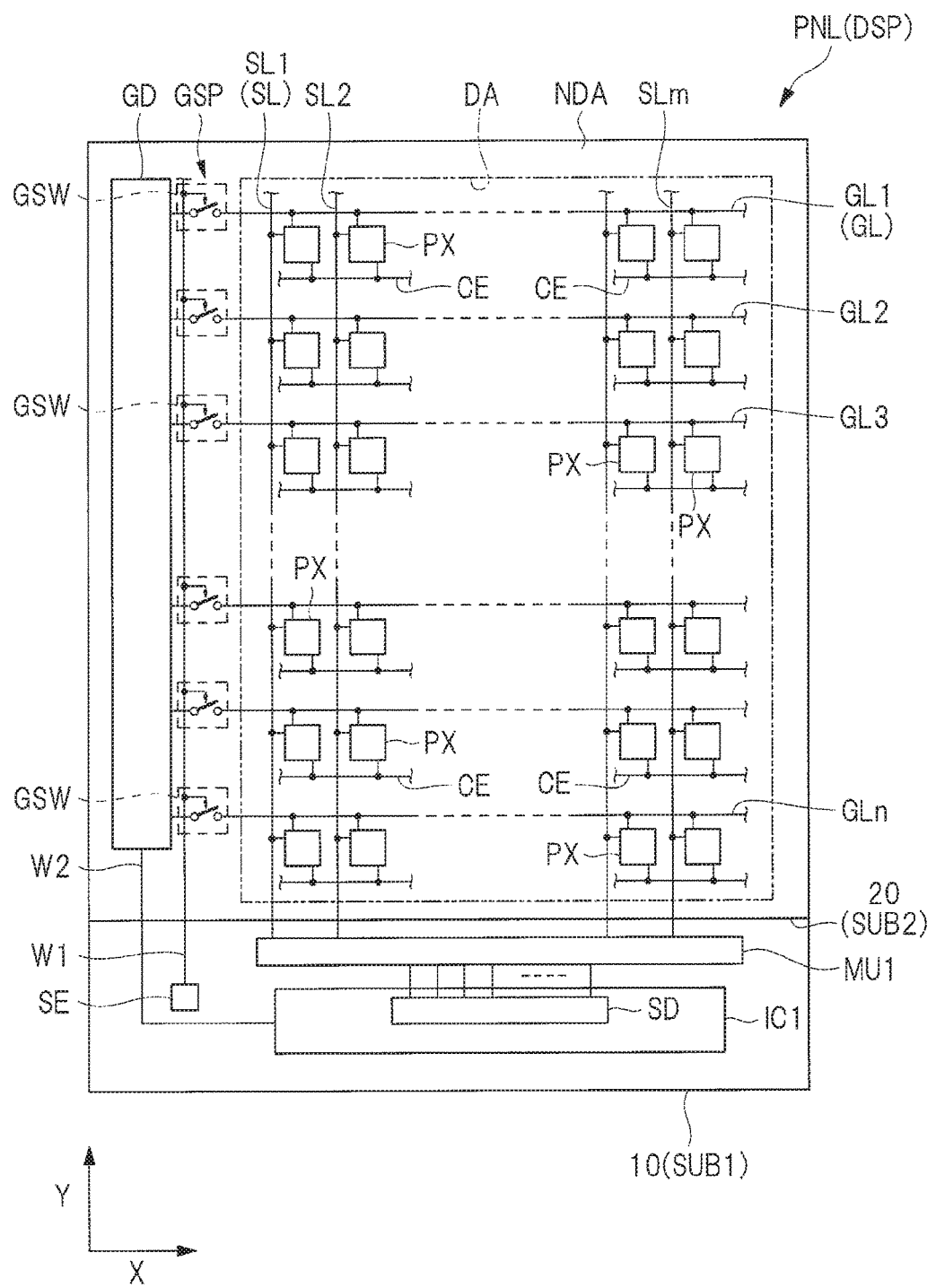
FIG. 1 is a plan view illustrating an example of a display device according to a first embodiment.

Hereinafter, each embodiment of the present invention will be described with reference to the drawings.

Note that this disclosure is an example only and suitable modifications which can be easily conceived by those skilled in the art without departing from the gist of the present invention are included within the scope of the invention as a matter of course. In addition, in order to further clarify the description, a width, a thickness, a shape, and the like of respective portions may be schematically illustrated in the drawings as compared to aspects of the embodiments, but they are examples only and do not limit the interpretation of the present invention.

In addition, in this specification and the respective drawings, the same components described in the drawings which have been described before are denoted by the same reference characters, and a detailed description thereof may be omitted as needed.

Further, hatching which is applied in order to distinguish a structure is sometimes omitted in the drawings used in the embodiments depending on the drawing.

(First Embodiment)

First, as a first embodiment, a description is given of an example in which a touch panel as an input device is applied to an in-cell display device with a touch detection function where a detection electrode of the input device is provided in a display panel of the display device and functions as a common electrode of the display device. Here, the display device according to the present first embodiment is a liquid crystal display device. Note that, in the present specification, the input device is an input device configured to at least detect electrostatic capacitance which changes depending on capacitance of an object in proximity to or in contact with an electrode. Here, as a method of detecting electrostatic capacitance, a self-capacitance method of detecting electrostatic capacitance of a single electrode may be used. In addition, the in-cell display device with a touch detection function means a display device with a touch detection function having a feature that a driving electrode or a detection electrode for touch detection functions as a driving electrode for displaying an image.

(Display Device)

Figure 2:
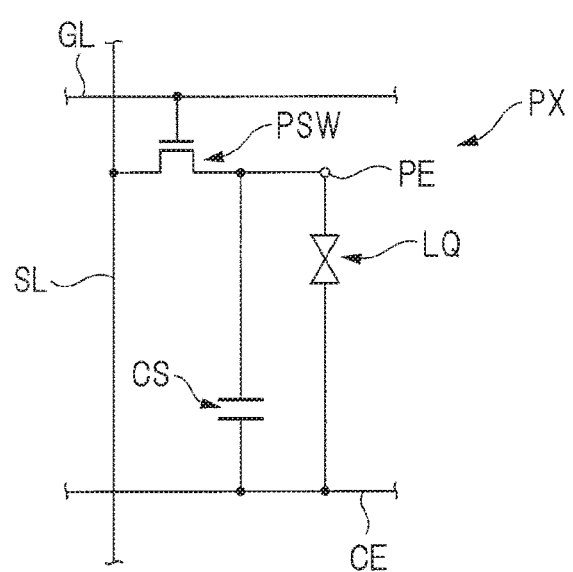
FIG. 2 is an equivalent circuit diagram illustrating a pixel in the display device according to the first embodiment.
Figure 3:
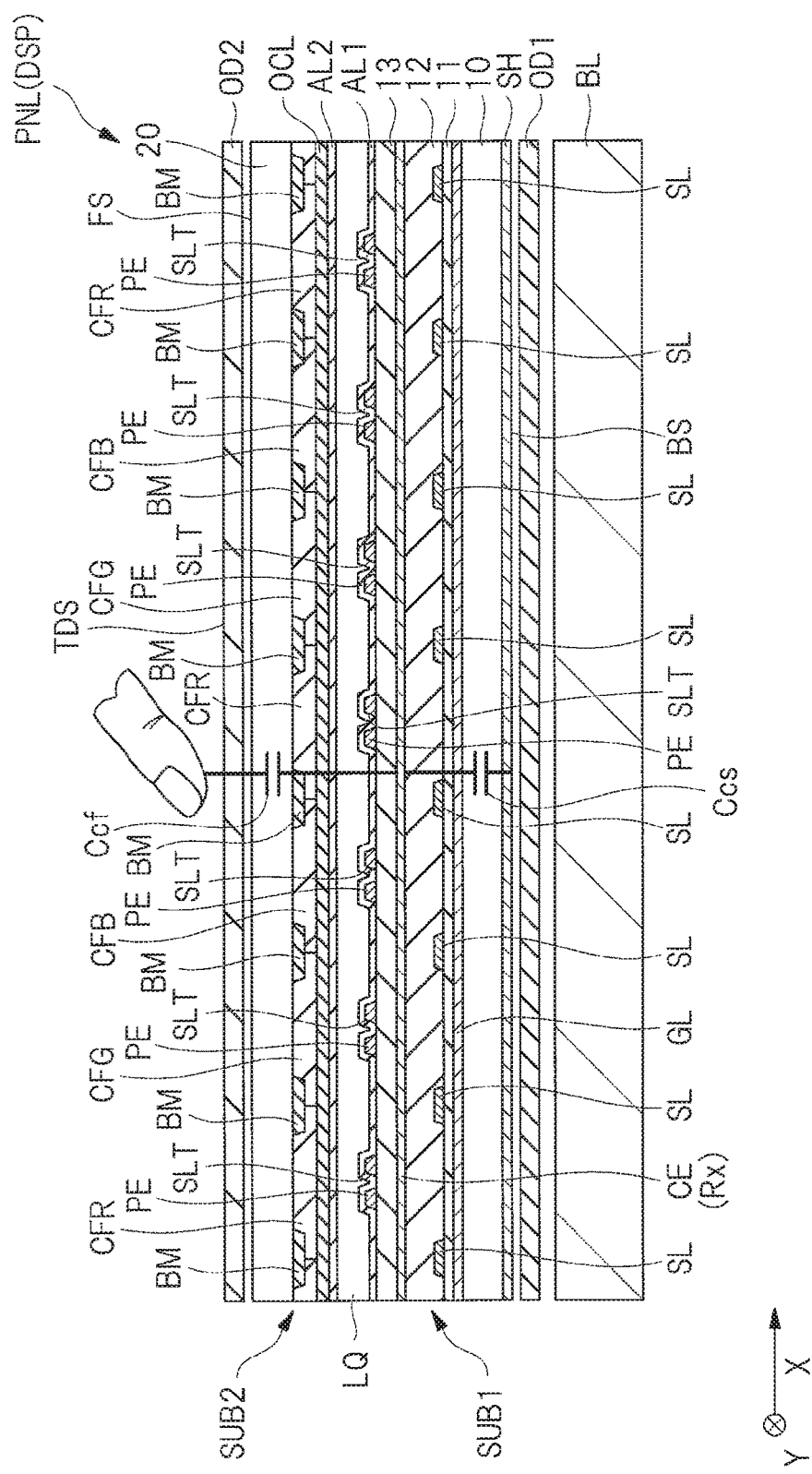
FIG. 3 is a cross-sectional view illustrating an example of the display device according to the first embodiment.
Figure 4:
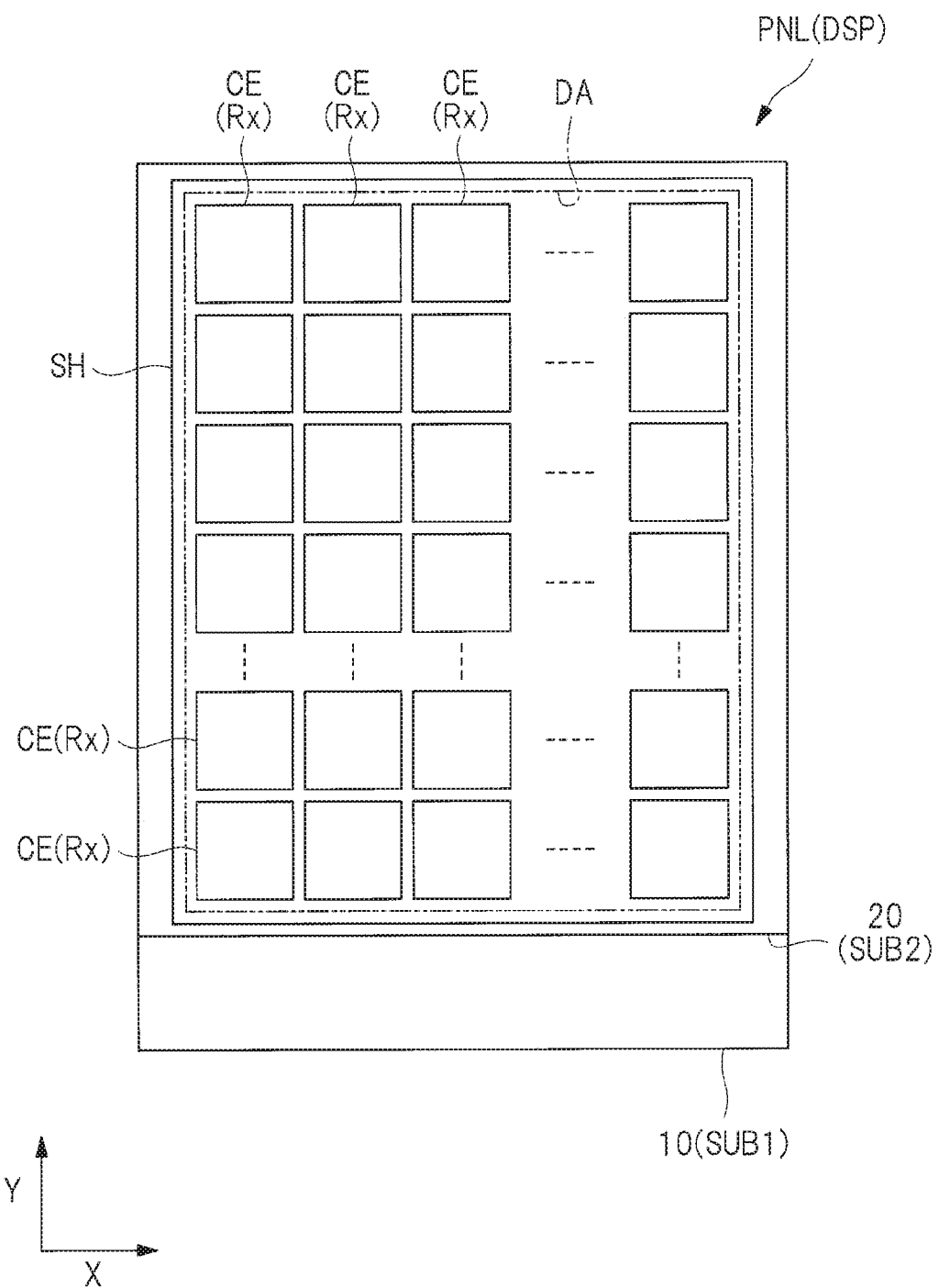
FIG. 4 is a plan view illustrating an example of arrangement of common electrodes in the display device according to the first embodiment.

FIG. 1 is a plan view illustrating an example of a display device according to a first embodiment. FIG. 2 is an equivalent circuit diagram illustrating a pixel in the display device according to the first embodiment. FIG. 3 is a cross-sectional view illustrating an example of the display device according to the first embodiment. FIG. 4 is a plan view illustrating an example of arrangement of common electrodes in the display device according to the first embodiment. Note that, in FIG. 3, a scan line GL which is not actually arranged in cross-section of FIG. 3 is illustrated together for the sake of convenience.

As illustrated in FIG. 1, a display device DSP as a liquid crystal display device includes a display panel PNL as an active matrix liquid crystal display panel, a driving IC chip IC1 driving the display panel PNL, and an electrostatic capacitance detection unit SE. The display panel PNL includes a front surface FS on a first side (on an upper side in FIG. 3) and a back surface BS on a side opposite to the first side (on a lower side in FIG. 3), and an image is displayed on the front surface FS. In addition, the detection unit SE as a touch detection circuit and a detection method performed by the detection unit SE will be described later with reference to FIGS. 14 to 19. Note that, although illustration is omitted, the display device DSP may also include a control module provided outside the display panel PNL, a flexible wiring board connecting the display panel PNL and the control module with each other, a driving IC chip driving the detection unit SE, and the like.

As illustrated in FIGS. 1 and 3, the display panel PNL as a liquid crystal display panel includes a substrate SUB1, a substrate SUB2 arranged so as to face the substrate SUB1, and a liquid crystal layer LQ arranged between the substrate SUB1 and the substrate SUB2. The substrate SUB2 is arranged on the first side (on the upper side in FIG. 3) with respect to the substrate SUB1. Note that, in the present first embodiment, the substrate SUB1 may also be referred to as an array substrate, and the substrate SUB2 may also be referred to as a counter substrate.

In addition, as illustrated in FIGS. 3 and 4, the display device DSP includes a plurality of detection electrodes Rx arranged inside the display panel PNL. The plurality of detection electrodes Rx overlap the display panel PNL when seen in a plan view. In addition, the plurality of detection electrodes Rx are arranged between the substrate SUB1 and the liquid crystal layer LQ.

Although a description will be given with reference to FIGS. 14 to 19 to be described later, the detection unit SE detects electrostatic capacitance of each of the plurality of detection electrodes Rx. In addition, in a case in which the plurality of detection electrodes Rx are provided inside the display panel PNL, the display device DSP is an in-cell display device with a touch detection function. Note that, as will be described later in a second embodiment, the detection electrode Rx may be provided outside the display panel PNL, and the display device DSP in this case is an on-cell display device with a touch detection function.

As illustrated in FIGS. 1 and 4, the display panel PNL includes a display area (active area) DA in which an image is displayed. It is assumed that two directions intersecting with each other, preferably orthogonal to each other when seen in a plan view are referred to as an X-axis direction and a Y-axis direction, respectively. In this case, the plurality of detection electrodes Rx are arrayed in a matrix in the X-axis direction and the Y-axis direction in the display area DA when seen in a plan view. That is, the plurality of detection electrodes Rx are arranged in a matrix in the display panel PNL when seen in a plan view. Note that, in the present specification, the wording "when seen in a plan view" means the case when seen from the direction perpendicular to the display surface of the display panel PNL.

As illustrated in FIG. 3, the display device DSP includes a backlight unit BL. The backlight unit BL is arranged on the side of the back surface of the substrate SUB1. Various forms can be adopted as such a backlight unit BL. Any backlight unit such as a backlight unit utilizing a light-emitting diode (LED), a cold cathode fluorescent lamp (CCFL), or the like as a light source is applicable, and a description regarding the detailed structure of the backlight unit BL will be omitted.

As illustrated in FIG. 1, in a non-display area NDA, the driving IC chip IC1 is provided on the substrate SUB1. The non-display area (NDA) is an area of the display panel PNL and is an area outside the display area DA. The driving IC chip IC1 includes a signal line drive circuit SD and the like.

As illustrated in FIG. 1, the display device DSP includes a multiplexer circuit MU1, a plurality of scan lines GL, a scan line drive circuit GD as a scan signal output circuit outputting a scan signal input to the plurality of scan lines, and a switching unit GSP switching a connection state between the scan line drive circuit GD and the plurality of scan lines GL. In addition, the display device DSP includes a plurality of signal lines SL, a plurality of common electrodes CE, and a plurality of pixels PX.

In the non-display area NDA, the multiplexer circuit MU1 and the scan line drive circuit GD are provided on the substrate SUB1. The driving IC chip IC1 is connected to the multiplexer circuit MU1 and the scan line drive circuit GD.

Note that, although illustration is omitted, a common electrode drive circuit may be provided on the substrate SUB1 in the non-display area NDA. The common electrode drive circuit switchably drives the common electrodes CE when the display device DSP displays an image.

In the display area DA, the plurality of pixels PX are arranged between the substrate SUB1 and the substrate SUB 2. The plurality of pixels PX are arranged in a matrix in the X-axis direction and the Y-axis direction, and m×n pixels PX are arranged (Note that each of m and n is a positive integer).

In the display area DA, scan lines GL1, GL2, GL3, and GLn as a part of n scan lines GL, and signal lines SL1, SL2, and SLm as a part of m signal lines SL, the common electrodes CE, and the like are formed above the substrate SUB1.

Each of the plurality of scan lines GL extends in the X-axis direction and is arrayed to be spaced apart from each other in the Y-axis direction. Each of the plurality of scan lines GL is drawn to the outside of the display area DA and is connected to the scan line drive circuit GD via a switching element GSW included in the switching unit GSP. Each of the plurality of signal lines SL extends in the Y-axis direction and is arrayed to be spaced apart from each other in the X-axis direction. In addition, the plurality of signal lines SL and the plurality of scan line GL intersect with each other. Each of the plurality of signal lines SL is drawn to the outside of the display area DA and connected to the multiplexer circuit MU1.

As illustrated in FIG. 4, the common electrodes CE are arrayed in a matrix in the X-axis direction and the Y-axis direction. In the present first embodiment, a description will be given by exemplifying a case in which the common electrode CE also serves as the detection electrode Rx for self-capacitance touch detection. However, the present invention is not limited to the case in which the common electrode CE also serves as the detection electrode Rx. In a case in which the common electrode CE does not serve also as the detection electrode Rx, each of the plurality of common electrodes CE may extend without being divided in the X-axis direction and may be arrayed to be spaced apart from each other in the Y-axis direction. Alternatively, each of the plurality of common electrodes CE may extend without being divided in the Y-axis direction and may be arrayed to be spaced apart from each other in the X-axis direction.

The driving IC chip IC1 is connected to the multiplexer circuit MU1 and the scan line drive circuit GD. In addition, in the example illustrated in FIG. 1, the detection unit SE and the switching element GSW are connected with each other by wire W1, and the driving IC chip IC1 and the scan line drive circuit GD are connected with each other by wire W2. Therefore, the detection unit SE can provide the switching element GSW with a control signal via the wire W1. For example, as will be described later with reference to FIG. 16, the detection unit SE can output a control signal (corresponding to a voltage V2 in FIG. 16) as an off voltage for bringing the switching element GSW into an off-state (non-conductive state) and can switch all the scan lines GL to an electrically floating state (floating state). Note that the detection unit SE may be included in the driving IC chip IC1, and the detection unit SE included in the driving IC chip IC1 and the switching element GSW may be connected with each other by the wire W1.

As illustrated in FIG. 2, each pixel PX includes a pixel switching element PSW and a pixel electrode PE. In addition, the plurality of pixels PX share the common electrode CE. The pixel switching element PSW includes, for example, a thin film transistor (TFT). The pixel switching element PSW is electrically connected to the scan line GL and the signal line SL. The pixel switching element PSW may be either a top gate type TFT or a bottom gate TFT. In addition, a semiconductor layer of the pixel switching element PSW is made of, for example, polycrystalline silicon (polysilicon) and may be made of amorphous silicon.

The pixel electrode PE is electrically connected to the pixel switching element PSW. The pixel electrode PE faces the common electrode CE via an insulating film. The common electrode CE, the insulating film, and the pixel electrode PE form a storage capacitor CS.

As illustrated in FIG. 3, the display device DSP includes an optical element OD1 and an optical element OD2. In addition, the display device DSP has a configuration corresponding to an FFS (fringe field switching) mode which is a horizontal electric field mode, as a display mode and may have a configuration corresponding to another display mode such as an IPS (in-plane switching) mode which is also a horizontal electric filed mode.

Note that, in the display device DSP utilizing the FFS mode, the substrate SUB1 is provided with the pixel electrodes PE and the common electrodes CE. Liquid crystal molecules constituting the liquid crystal layer LQ are switched by mainly utilizing a horizontal electric field (especially, an electric field substantially parallel to the main surface of the substrate in a fringe electric field) formed between the pixel electrode PE and the common electrode CE.

The substrate SUB1 and the substrate SUB2 are bonded together in a state such that they are spaced apart from each other with a fixed interval therebetween. The liquid crystal layer LQ is sealed between the substrate SUB1 and the substrate SUB2.

As illustrated in FIG. 3, the substrate SUB 1 includes an insulating substrate 10 having a light transmitting property such as a glass substrate or a resin substrate. In addition, the substrate SUB1 includes the plurality of scan lines GL, the plurality of signal lines SL, the plurality of common electrodes CE, the plurality of pixel electrodes PE, an insulating film 11, an insulating film 12, an insulating film 13, and an alignment film AL1 on the side of the insulating substrate 10 facing the substrate SUB1. Note that, in FIG. 3, one scan line GL and one common electrode CE are illustrated.

The scan line GL is formed on the insulating substrate 10. The scan line GL is made of a metal such as chromium (Cr) or molybdenum (Mo) or an alloy thereof.

The insulating film 11 is formed over the scan line GL and the insulating substrate 10. The insulating film 11 is a transparent insulating film made of, for example, silicon nitride, silicon oxide, or the like. Note that, although a detailed description will be omitted, in addition to the scan line GL, a gate electrode of the pixel switching element, the semiconductor layer, and the like are formed between the insulating substrate 10 and the insulating film 11.

The signal line SL is formed on the insulating film 11. The signal line SL is made of a metal film of a multilayer structure obtained, for example, by sandwiching aluminum (Al) by molybdenum (Mo) or the like. In addition, a source electrode, a drain electrode, and the like of the pixel switching element are formed on the insulating film 11. In the illustrated example, the signal line SL extends in the Y-axis direction.

The insulating film 12 is formed over each of the signal lines SL and the insulating film 11. The insulating film 12 is made of, for example, an acrylic photosensitive resin.

The common electrode CE is formed on the insulating film 12. Note that the plurality of common electrodes CE are provided as described before and also serve as the detection electrode Rx for touch detection. The common electrode CE is made of a transparent conductive material such as ITO (indium tin oxide), IZO (indium zinc oxide), or the like. Note that, in a case in which the display device is a display device of a TN (twisted nematic) mode, a VA (vertical alignment) mode, or the like as a vertical electric field mode, the common electrode CE may be formed in the substrate SUB2.

The insulating film 13 is formed over each of the common electrodes CE and the insulating film 12. The pixel electrode PE is formed on the insulating film 13. Each pixel electrode PE is positioned between two adjacent signal lines SL, and faces the common electrode CE. In addition, each pixel electrode PE includes a slit SLT at a position facing the common electrode CE. Such a pixel electrode PE is made of a transparent conductive material such as ITO, IZO, or the like. The alignment film AL1 covers the pixel electrodes PE and the insulating film 13.

In contrast, the substrate SUB2 includes an insulating substrate 20 having a light transmitting property such as a glass substrate and a resin substrate. In addition, the substrate SUB2 includes a black matrix BM, color filters CFR, CFG, and CFB, an overcoat layer OCL, and an alignment film AL2 on the side of the insulating substrate 20 facing the substrate SUB1.

The black matrix BM is formed on the surface of the insulating substrate 20 on the side of the substrate SUB1 and partitions each pixel. Each of the color filters CFR, CFG, and CFB is formed on the surface of the insulating substrate 20 on the side of the substrate SUB1, and a part of each of the color filters CFR, CFG, and CFB overlaps the black matrix BM when seen in a plan view. The color filter CFR is a red color filter, the color filter CFG is a green color filter, and the color filter CFB is a blue color filter. The overcoat layer OCL covers the color filters CFR, CFG, and CFB. The overcoat layer OCL is made of a transparent resin material. The alignment film AL2 covers the overcoat layer OCL.

The optical element OD1 is arranged between the insulating substrate 10 and the backlight unit BL. The optical element OD2 is arranged above the insulating substrate 20, that is, on the side opposite to the substrate SUB1 with the insulating substrate 20 interposed therebetween. Each of the optical element OD1 and the optical element OD2 includes at least a polarizing plate and may include a waveplate as necessary.

Note that the optical element OD1 may adhere to the insulating substrate 10 with an adhesive layer (illustration is omitted), and the optical element OD2 may adhere to the insulating substrate 20 with an adhesive layer (illustration is omitted).

As illustrated in FIGS. 3 and 4, the display device DSP includes a shield electrode SH. The shield electrode SH overlaps the display panel PNL when seen in a plan view. In addition, although a description will be given with reference to FIG. 16 to be described later, the shield electrode SH overlaps each of the plurality of detection electrodes Rx when seen in a plan view, and the shield electrode SH overlaps each of the plurality of scan lines and the plurality of signal lines when seen in a plan view. The shield electrode SH is made of a transparent conducive material such as ITO or IZO. Note that the detection unit SE (see FIG. 1) detects electrostatic capacitance of the shield electrode SH.

The shield electrode SH is arranged on the side (on the lower side in FIG. 3) opposite to the first side with respect to the substrate SUB1, that is, the insulating substrate 10. In other words, the shield electrode SH is arranged on the side opposite to the side of the front surface FS of the display panel PNL with respect to the substrate SUB1, that is, the insulating substrate 10.

Therefore, the shield electrode SH is arranged on the side (on the lower side in FIG. 3) opposite to the first side with respect to the plurality of detection electrodes Rx. In other words, the shield electrode SH is arranged on the side opposite to the side of the front surface FS of the display panel PNL, that is, on the side of the back surface BS of the display panel PNL with respect to the plurality of detection electrodes Rx.

Therefore, it is possible to prevent or suppress an influence caused by an object brought in proximity to or into contact with the display panel PNL from the side of the back surface BS of the display panel PNL on a change in electrostatic capacitance of each of the plurality of detection electrodes Rx. That is, the shield electrode SH can shield each of the plurality of detection electrodes Rx from a change in the electric field caused by an object brought in proximity to or into contact with the display panel PNL from the side of the back surface BS of the display panel PNL.

<Self-Capacitance Touch Detection Method>

Next, a method in which the display device DSP detects the position of an input tool made of an object such as a finger, that is, the input position, by utilizing the detection electrode Rx, will be described.

The display device DSP can determine input position information based on a change in the electrostatic capacitance detected by the detection electrode Rx by using a self-capacitance detection (Self-Capacitive Sensing) method. Therefore, the fact that a finger is in contact with a touch detection surface TDS (see FIG. 3) of the display device DSP or the fact that a finger is in proximity to the touch detection surface TDS of the display device DSP can be detected. In the present first embodiment, the touch detection surface TDS is a surface of the optical element OD2 on the side opposite to the side of the substrate SUB2.

Hereinafter, a touch detection method using the self-capacitance detection method (self-capacitance touch detection method) will be described. However, the display device DSP may determine the input position information based on a change in the electrostatic capacitance detected by the detection electrode Rx by using a mutual-capacitance detection (Mutual-Capacitance Sensing) method.

Determination on the input position information based on the self-capacitance detection method is made by writing a writing signal to each of the detection electrodes Rx and reading a reading signal indicating a change in the electrostatic capacitance generated in each of the detection electrodes Rx to which the writing signal is written.

Next, a mechanism of the touch detection method using the self-capacitance detection method will be described. In the self-capacitance detection method, a capacitor Cx1 of the detection electrode Rx is utilized. In addition, in the self-capacitance detection method, a capacitor Cx2 generated by a finger of a user or the like in proximity to the detection electrode Rx is utilized.

FIGS. 5 to 8 are diagrams for describing a self-capacitance detection method.

Figure 5:
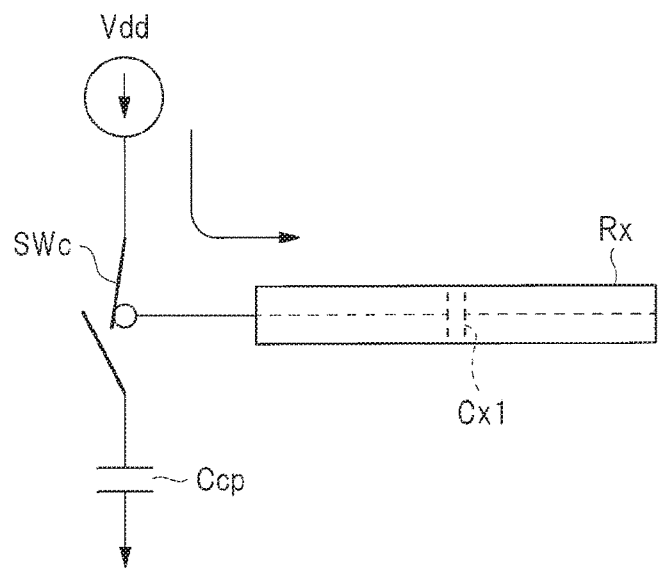
FIG. 5 is a diagram for describing a self-capacitance detection method.
Figure 6:
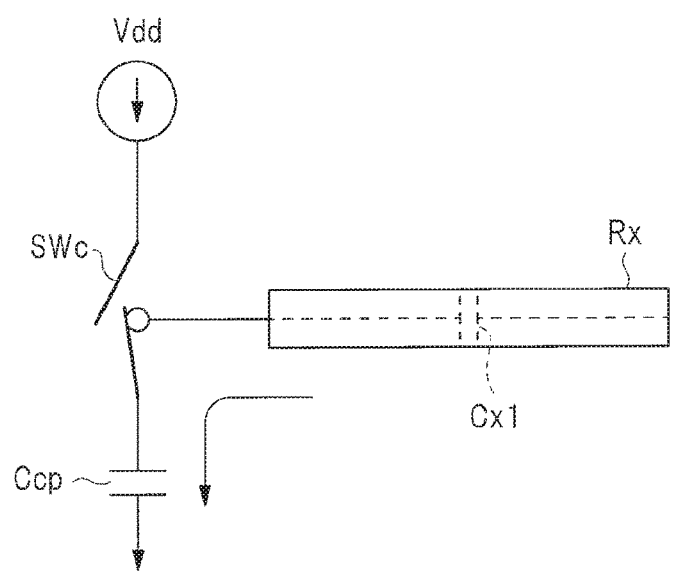
FIG. 6 is a diagram for describing the self-capacitance detection method.

Each of FIGS. 5 and 6 illustrates a state where a finger of a user is neither in contact with nor in proximity to the touch detection surface of the display device DSP. Therefore, electrostatic capacitance coupling is not generated between the detection electrode Rx and the finger. FIG. 5 illustrates a state where the detection electrode Rx is connected to a power supply Vdd by a control switch SWc. FIG. 6 illustrates a state where the detection electrode Rx is cut-off from the power supply Vdd by the control switch SWc and the detection electrode Rx is connected to a capacitor Ccp as a capacitor.

In the state illustrated in FIG. 5, for example, the capacitor Cx1 is charged, and in the state illustrated in FIG. 6, for example, the capacitor Cx1 is discharged. Here, the fact that the capacitor Cx1 is charged means that a writing signal is written to the detection electrode Rx. In addition, the fact that the capacitor Cx1 is discharged means that a reading signal indicating a change in the electrostatic capacitance generated in the detection electrode Rx is read.

Figure 7:
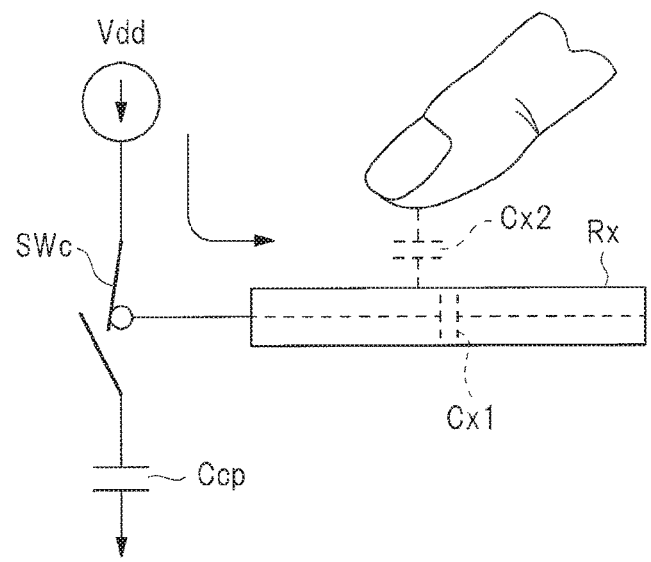
FIG. 7 is a diagram for describing the self-capacitance detection method.
Figure 8:
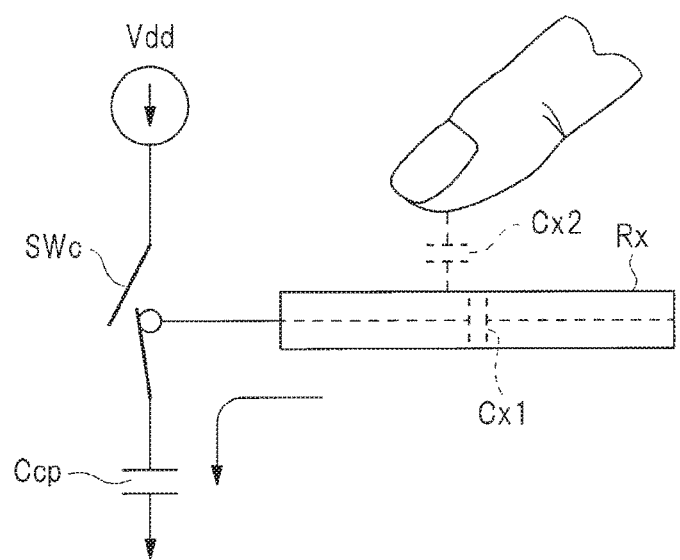
FIG. 8 is a diagram for describing the self-capacitance detection method.

In contrast, each of FIGS. 7 and 8 illustrates a state where a finger of a user is in contact with or in proximity to the touch detection surface of the display device DSP. Therefore, electrostatic capacitance coupling is generated between the detection electrode Rx and the finger. FIG. 7 illustrates a state where the detection electrode Rx is connected to the power supply Vdd by the control switch SWc. FIG. 8 is a state where the detection electrode Rx is cut-off from the power supply Vdd by the control switch SWc, and the detection electrode Rx is connected to the capacitor Ccp.

In the state illustrated in FIG. 7, for example, the capacitor Cx1 is charged, and in the state illustrated in FIG. 8, for example, the capacitor Cx1 is discharged.

Here, time dependency of the voltage of the capacitor Ccp upon discharging illustrated in FIG. 6 is clearly different from time dependency of the voltage of the capacitor Ccp upon discharging illustrated in FIG. 8 due to existence of the capacitor Cx2. Therefore, in the self-capacitance detection method, input position information (for example, presence or absence of operation input) is determined by utilizing the fact that time dependency of the voltage of the capacitor Ccp differs depending on the presence or the absence of the capacitor Cx2.

Figure 9:
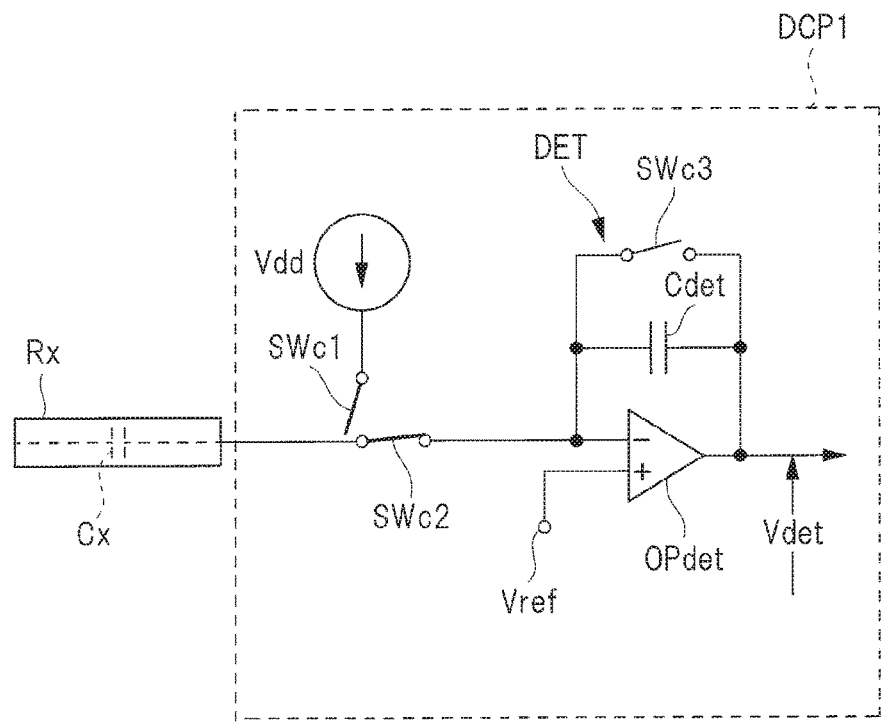
FIG. 9 is a diagram illustrating an example of a circuit realizing the self-capacitance detection method.

Next, an example of a circuit realizing the self-capacitance detection method will be described. FIG. 9 is a diagram illustrating an example of a circuit realizing the self-capacitance detection method. Note that, in FIG. 9, a capacitor of the detection electrode Rx is referred to as a capacitor Cx.

The circuit realizing the self-capacitance detection method as illustrated in FIG. 9 is provided, for example, in the detection unit SE illustrated in FIG. 1. Alternatively, the detection unit SE may be provided, for example, in the driving IC chip IC1 illustrated in FIG. 1, and such a circuit realizing the self-capacitance detection method may be provided in the driving IC chip IC1.

As illustrated in FIG. 9, the detection electrode Rx is switchably connected to the power supply Vdd by the switch SWc1. In addition, the detection electrode Rx is switchably connected to a voltage detector DET as an integrating circuit by the switch SWc2. The voltage detector DET includes, for example, an operational amplifier OPdet, a capacitor Cdet, and a switch SWc3. A reference signal Vref is input to the operational amplifier OPdet.

Note that FIG. 9 illustrates a detection circuit DCP1 included in the detection unit SE to be described with reference to FIG. 16.

Figure 10:
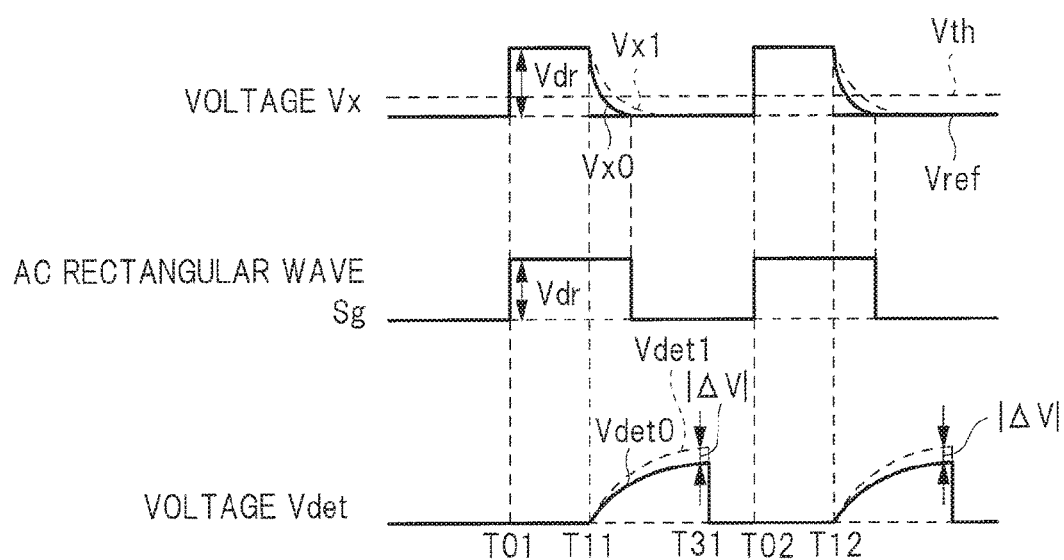
FIG. 10 is a graph schematically illustrating an example of time dependency of an AC rectangular wave Sg output from a power supply, a voltage Vx of a detection electrode, and a voltage Vdet as an output of a voltage detector.

FIG. 10 is a graph schematically illustrating an example of time dependency of an AC rectangular wave Sg output from the power supply, a voltage Vx of the detection electrode, and a voltage Vdet as an output of the voltage detector.

As illustrated in FIG. 10, the power supply Vdd outputs an AC rectangular wave Sg one cycle of which is equal to the time difference between a time point T01 and a time point T02 and which has a waveform amplitude of a voltage Vdr. For example, the AC rectangular wave Sg has a frequency within a range from about several kilohertz to several hundred kilohertz. The voltage detector DET converts fluctuation in current corresponding to the AC rectangular wave Sg to fluctuation in voltage (waveform Vdet0 and waveform Vdet1).

As described above, the detection electrode Rx is switchably connected to the power supply Vdd and the voltage detector DET by the switches SWc1 and SWc2. In FIG. 10, the AC rectangular wave Sg increases the voltage by the voltage Vdr at the time point T01. In this case, the switch SWc1 is turned on, and the switch SWc2 is turned off. Therefore, a voltage Vx of the detection electrode Rx also increases by the voltage Vdr. Next, before a time point T11, the switch SWc1 is turned off. In this case, although the detection electrode Rx is in an electrically floating state, an increase in the voltage Vx of the detection electrode Rx by the voltage Vdr is maintained by the capacitor Cx1 (see FIG. 5) of the detection electrode Rx or the capacitors Cx1+Cx2 (see FIG. 7) obtained by adding the capacitor Cx2 generated by contact or proximity of a finger or the like to the capacitor Cx1 of the detection electrode Rx. Furthermore, before the time point T11, the switch SWc3 is turned on, and after a predetermined time has passed, the switch SWc3 is turned off, whereby the voltage detector DET is reset. This reset operation makes a voltage Vdet as the output of the voltage detector DET substantially equal to a voltage of the reference signal Vref.

Subsequently, when the switch SWc2 is turned on at the time point T11, a voltage input to an inverting input unit of the voltage detector DET becomes equal to the voltage Vx of the detection electrode Rx. Thereafter, the voltage of the inverting input unit of the voltage detector DET lowers to the voltage of the reference signal Vref according to a time constant due to the capacitor Cx1 of the detection electrode Rx (or the capacitors Cx1+Cx2) and the capacitor Cdet included in the voltage detector DET. In this case, since charges accumulated in the capacitor Cx1 of the detection electrode Rx (or the capacitors Cx1+Cx2) move to the capacitor Cdet included in the voltage detector DET, the voltage Vdet of the voltage detector DET increases. When an object such as a finger is neither in proximity to nor in contact with the detection electrode Rx, the waveform of the voltage Vdet is Vdet0 illustrated in a solid line, and a relation Vdet=Cx1×Vdr/Cdet is satisfied. When an object such as a finger is brought in proximity or into contact and a capacitor generated due to an influence of the object is added, the waveform of the voltage Vdet is Vdet1 illustrated in a broken line, and a relation Vdet=(Cx1+Cx2)×Vdr/Cdet is satisfied.

Then, at a time point T31 after charges of the capacitor Cx1 of the detection electrode Rx (or the capacitors Cx1+Cx2) have sufficiently moved to the capacitor Cdet, the switch SWc2 is turned off, and the switches SWc1 and SWc3 are turned on. Therefore, the voltage of the detection electrode Rx becomes equal to the voltage of the AC rectangular wave Sg at the low level, and the voltage detector DET is reset. Note that, in this case, the timing at which the switch SWc1 is turned on may be any timing as long as the timing is before the time point T02 after the switch SWc2 is turned off. In addition, the timing at which the voltage detector DET is reset may be any timing as long as the timing is before a time point T12 after the switch SWc2 is turned off. The above operation is repeated at a predetermined frequency (for example, within a range from about several kilohertz to several hundred kilohertz). Then, presence or absence (presence or absence of touching) of an object in proximity to or in contact with the touch detection surface from outside can be detected based on an absolute value |ΔV| of the difference between the waveform Vdet0 and the waveform Vdet1.

Note that, when an object such as a finger is neither in proximity to nor in contact, the waveform of the voltage Vx of the detection electrode Rx is a waveform Vx0 illustrated in the solid line, and when an object such as a finger is in proximity to or in contact and the capacitor Cx2 generated due to an influence of the object is added, the waveform of the voltage Vx of the detection electrode Rx becomes a waveform Vx1 illustrated in the broken line. Also by measuring the time until each of the waveforms Vx0 and Vx1 lowers to a predetermined threshold voltage Vth, presence or absence (presence or absence of touching) of an object in proximity to or in contact with the touch detection surface from outside can be detected.

Figure 11:
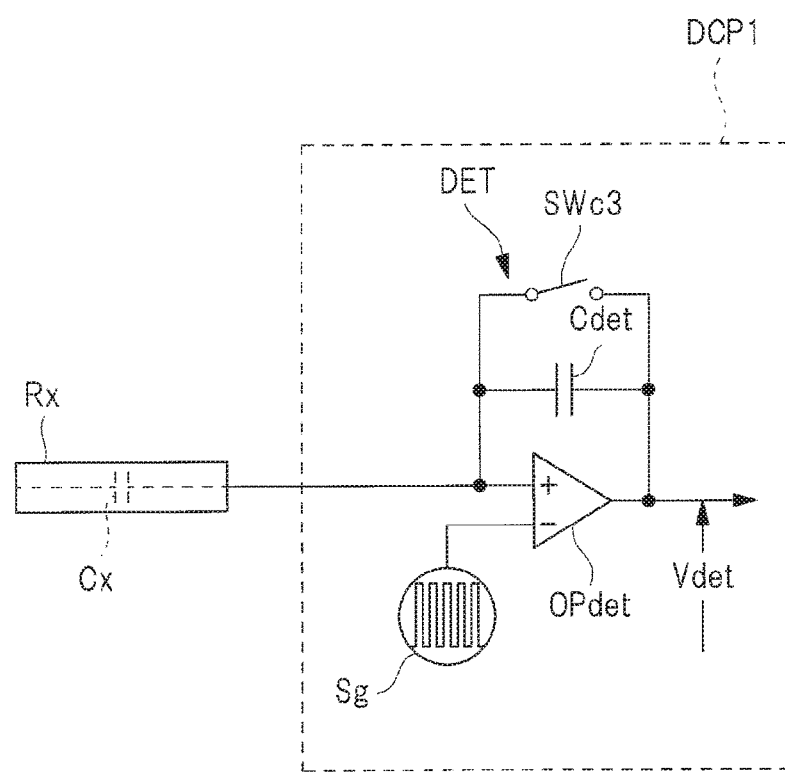
FIG. 11 is a diagram illustrating another example of the circuit realizing the self-capacitance detection method.

Alternatively, another example may be used as a circuit realizing the self-capacitance detection method. FIG. 11 is a diagram illustrating another example of the circuit realizing the self-capacitance detection method.

The circuit realizing the self-capacitance detection method as illustrated in FIG. 11 is provided, for example, in the detection unit SE illustrated in FIG. 1. Alternatively, the detection unit SE may be provided, for example, in the driving IC chip IC1 illustrated in FIG. 1, and such a circuit realizing the self-capacitance detection method may be provided in the driving IC chip IC1.

As illustrated in FIG. 11, the detection electrode Rx is connected to the voltage detector DET as the integrating circuit. The voltage detector DET includes, for example, the operational amplifier OPdet, the capacitor Cdet, and the switch SWc3. The detection electrode Rx is connected to a non-inverting input terminal represented by "+" among two input terminals of the operational amplifier OPdet, and the AC rectangular wave Sg is input to an inverting input terminal represented by "−" among two input terminals of the operational amplifier OPdet. In addition, in the operational amplifier OPdet, the inverting input terminal and the non-inverting input terminal are imaginarily short-circuited. When the detection electrode Rx is connected to the detection circuit DCP1, the switch SWc3 is turned off (in a non-conductive state), and when the detection electrode Rx is not connected to the detection circuit DCP1, the switch SWc3 is turned on (in a conductive state).

Note that FIG. 11 illustrates the detection circuit DCP1 included in the detection unit SE to be described with reference to FIG. 16.

Figure 12:
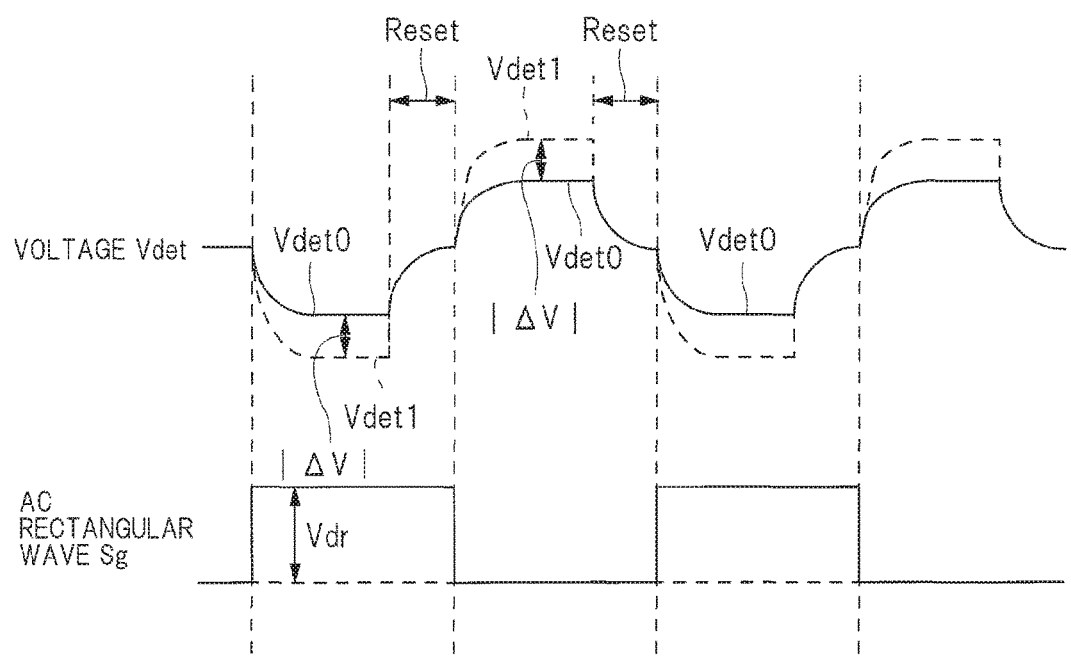
FIG. 12 is a graph schematically illustrating an example of time dependency of an AC rectangular wave Sg and a voltage Vdet as an output of the voltage detector.

FIG. 12 is a graph schematically illustrating an example of time dependency of the AC rectangular wave Sg and the voltage Vdet as the output of the voltage detector.

As illustrated in FIG. 12, the AC rectangular wave Sg has a waveform amplitude of the voltage Vdr. As described before, since the operational amplifier OPdet is imaginarily short-circuited, when the AC rectangular wave Sg is input to the inverting input terminal of the operational amplifier OPdet, a driving signal having the same electric potential as that of the AC rectangular wave Sg is applied to the detection electrode Rx connected to the non-inverting input terminal of the operational amplifier OPdet.

In contrast, since the detection electrode Rx has the capacitor Cx, a difference voltage between the electric potential of the detection electrode Rx and the driving signal is generated, and a current corresponding to the difference voltage flows between the detection electrode Rx and the non-inverting input terminal of the operational amplifier OPdet. The value obtained by converting the current into a voltage and integrating the voltage by the voltage detector DET is output as the voltage Vdet having the waveform Vdet0 from the voltage detector DET. The waveform Vdet0 of the voltage Vdet is illustrated in the solid line in FIG. 12.

When an object such as a finger is brought in proximity to or into contact with the detection electrode Rx, the capacitor Cx increases. Therefore, the difference voltage generated between the electric potential of the detection electrode Rx and the driving signal increases, and the current corresponding to the difference voltage and flowing between the detection electrode Rx and the non-inverting input terminal of the operational amplifier OPdet increases. Thus, the value obtained by converting the current into a voltage and integrating the voltage by the voltage detector DET increases, and a change in the waveform Vdet1 of the voltage Vdet output from the voltage detector DET increases in comparison with the change in the waveform Vdet0. The waveform Vdet1 is illustrated in the broken line in FIG. 12.

Therefore, by comparing the voltage Vdet output from the voltage detector DET with a predetermined threshold voltage, presence or absence of proximity or contact of a finger or the like to the detection electrode Rx can be detected. That is, presence or absence (presence or absence of touching) of an object in proximity to or into contact with the touch detection surface from outside can be detected based on the absolute value |ΔV| of the difference between the waveform Vdet0 and the waveform Vdet1. Note that, in order to accurately detect the absolute value |ΔV|, the operation of the voltage detector DET may be, for example, an operation in which a period Reset for resetting charging and discharging of the capacitor Cdet is provided in accordance with the frequency of the AC rectangular wave Sg by the switch SWc3.

The detection method described above with reference to FIGS. 11 and 12 differs from the detection method described with reference to FIGS. 9 and 10 in that neither the switch SWc1 nor the switch SWc2 is required and the AC rectangular wave Sg as a driving signal is directly supplied to the operational amplifier OPdet.

Note that the detection circuit DCP1 illustrated in FIG. 11 can be used for both of the self-capacitance detection method and the mutual-capacitance detection method. In a case in which the detection circuit DCP1 illustrated in FIG. 11 is used for the mutual-capacitance detection method, connection may be switched such that the inverting input terminal of the operational amplifier OPdet is connected to a supply circuit supplying a reference signal as a fixed potential instead of the supply circuit supplying the AC rectangular wave Sg.

Figure 13:
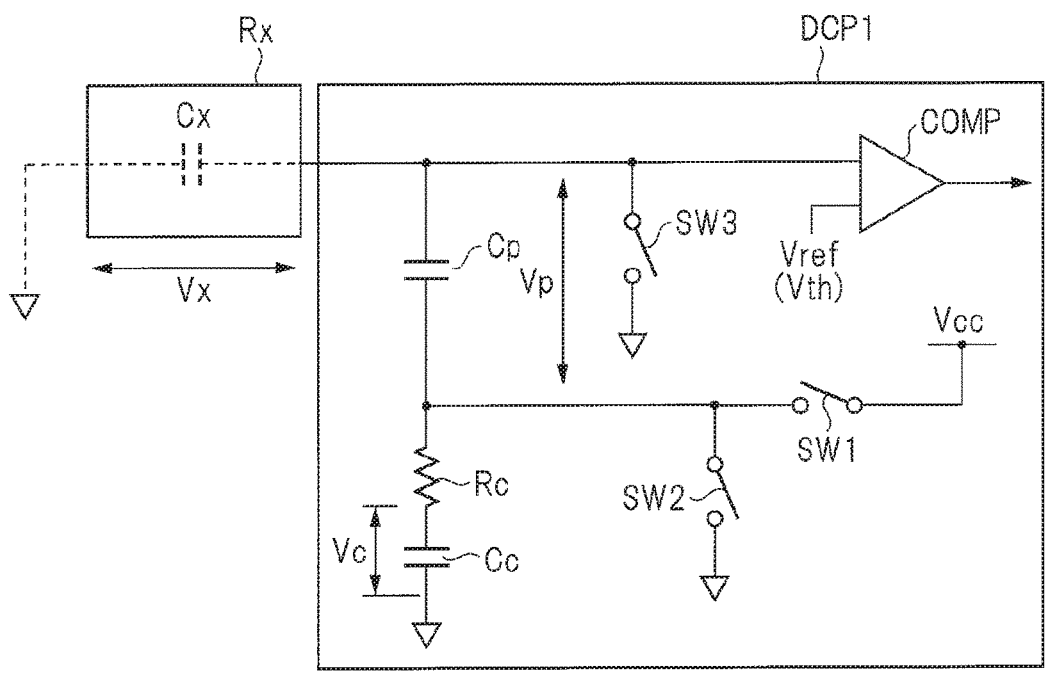
FIG. 13 is a diagram illustrating still another example of the circuit realizing the self-capacitance detection method.

Alternatively, yet another example may be used as the circuit realizing the self-capacitance detection method. FIG. 13 is a diagram illustrating still another example of the circuit realizing the self-capacitance detection method.

In the example illustrated in FIG. 13, the detection electrode Rx is connected to one terminal of a capacitor Cp for voltage dividing and is connected to one input terminal of a comparator COMP. The detection electrode Rx has its own capacitor Cx. A supply terminal of the reference signal Vref is connected to the other input terminal of the comparator COMP.

The other terminal of the capacitor Cp is connected to a power supply wire of a voltage Vcc via the switch SW1. In addition, the other terminal of the capacitor Cp is connected to one terminal of a capacitor Cc via a resistor Rc. The other terminal of the capacitor Cc is connected to a reference potential (for example, a ground potential).

The switch SW2 is connected between the other terminal of the capacitor Cp and the reference potential, and the switch SW3 is connected between the one terminal of the capacitor Cp and the reference potential. The switches SW1, SW2, and SW3, and the comparator COMP are provided, for example, in the detection unit SE illustrated in FIG. 1.

Note that FIG. 13 illustrates the detection circuit DCP1 included in the detection unit SE to be described with reference to FIG. 16.

In the example illustrated in FIG. 13, the switch SW1 is turned on (in a conductive state) at fixed intervals, and the capacitor Cc can be charged in the on-state. When the capacitor Cc is charged, the switches SW2 and SW3 are turned off. After the capacitor Cc has been charged, all the switches SW1, SW2, and SW3 are turned off, and charges of the capacitor Cc are held.

Subsequently, while the switch SW1 is kept in the off-state, the switches SW2 and SW3 are turned on for a fixed period. Then, most of the charges of the capacitors Cp and Cx are discharged, and some of the charges of the capacitor Cc are discharged through the resistor Rc.

Next, all the switches SW1, SW2, and SW3 are turned off. Then, the charges of the capacitor Cc move to the capacitors Cp and Cx. Then, in the comparator COMP, the voltage Vx of the capacitor Cx is compared with the reference signal Vref or the threshold voltage Vth.

It is assumed that a voltage of the capacitor Cc is a voltage Vc and a voltage of the capacitor Cp is a voltage Vp. In this case, the voltage Vx is equal to the sum of the voltage Vc and the voltage Vp, and the characteristics of changes or the degree of conversion of the voltage Vc change depending on the total value of the capacitors Cp and Cx. The change in the capacitor Cx influences the voltage Vx of the capacitor Cx as well. In addition, the value of the capacitor Cx differs depending on the degree of approach of a finger of a user to the detection electrode Rx.

Therefore, when the finger is far from the detection electrode Rx, time dependency of the voltage Vc shows characteristics with a slow change, and when the finger is close to the detection electrode Rx, time dependency of the voltage Vc shows characteristics with a quick change.

The comparator COMP compares the voltage Vx with the reference signal Vref or the threshold voltage Vth in synchronization with repetition of switching between the on-state and the off-state of the switches SW2 and SW3. Then, when a relation Vx>Vref is satisfied, the comparator COMP obtains an output pulse. However, when a relation Vx<Vref is satisfied, the comparator COMP stops the output pulse.

In this case, the time period during which an output pulse of the comparator COMP can be obtained may be counted, or the number of output pulses of the comparator COMP (the number of pulses after the capacitor Cc is charged until the relation Vx<Vref is satisfied) may be counted.

Thus, also by the method described with reference to FIG. 13, the degree of proximity or contact of a finger to the detecting surface can be determined based on the state of the output pulse of the comparator COMP.

<Touch Detection Method and Touch Detection Circuit>

Next, the touch detection method and the touch detection circuit in the display device of the present first embodiment will be described.

Figure 14:
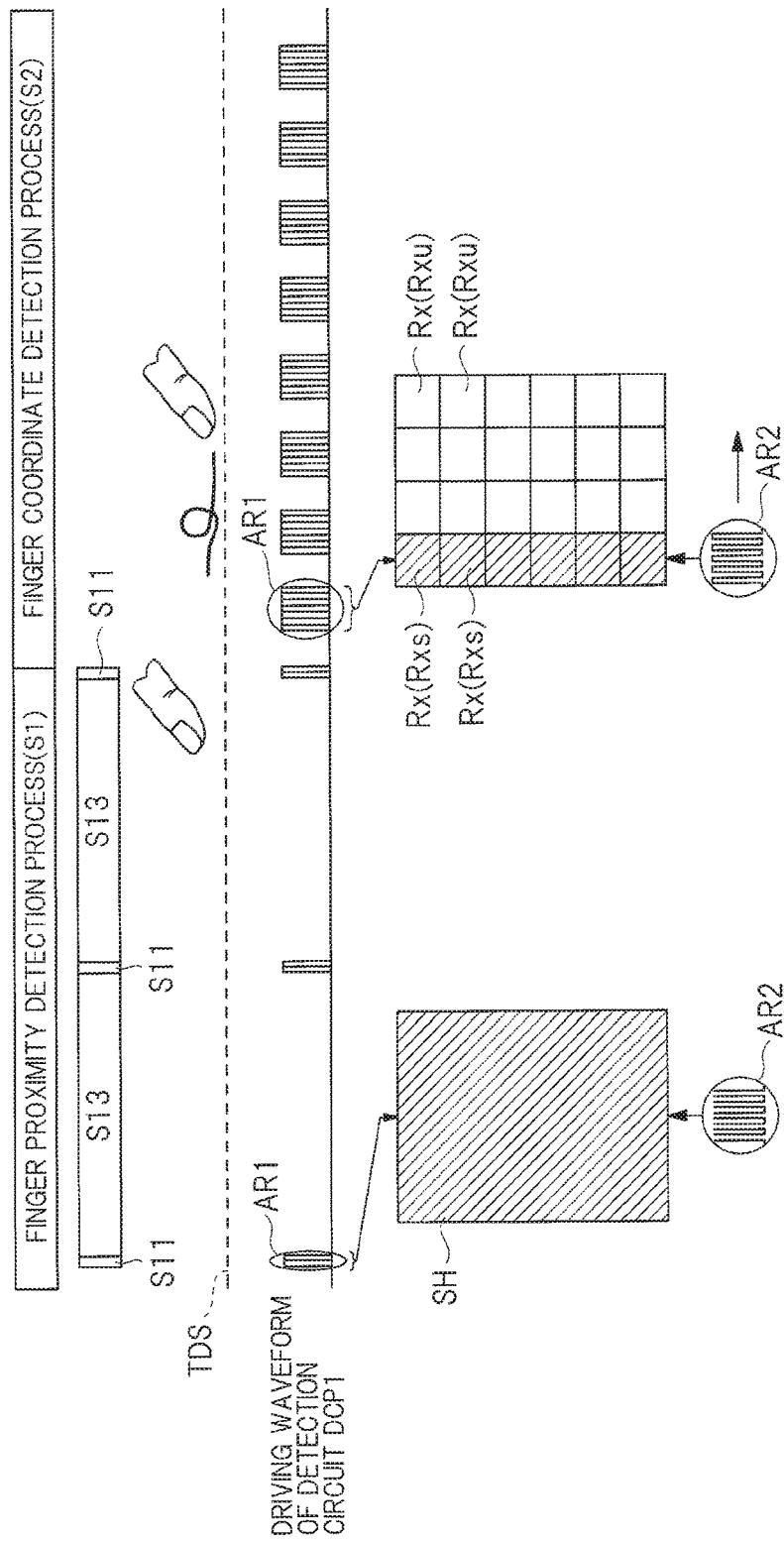
FIG. 14 is a diagram for describing a touch detection method in the display device according to the first embodiment.
Figure 15:
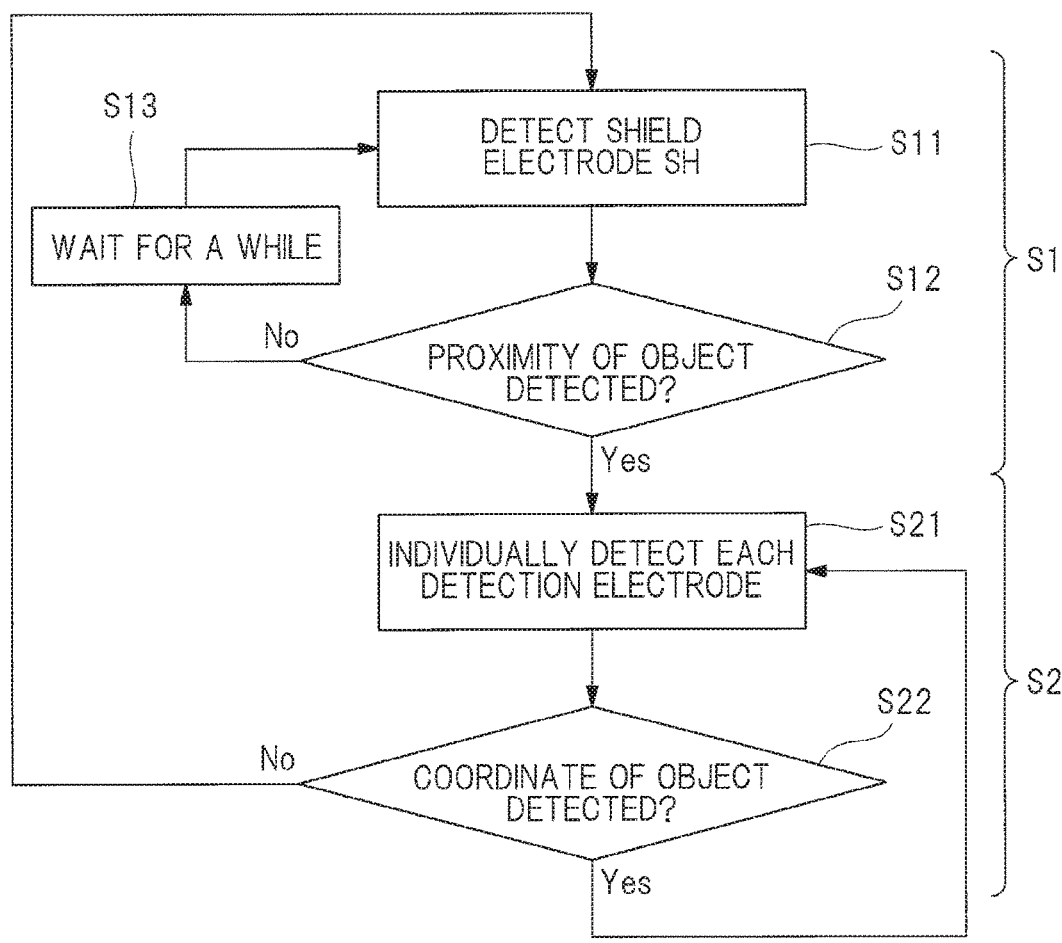
FIG. 15 is a flow diagram for describing the touch detection method in the display device according to the first embodiment.

First, the touch detection method in the display device according to the present first embodiment will be described. FIG. 14 is a diagram for describing a touch detection method in the display device according to the first embodiment. FIG. 15 is a flow diagram for describing the touch detection method in the display device according to the first embodiment. Note that an area AR1 which is a hatched portion in FIG. 14 is a portion to which a driving signal having, for example, a rectangular wave is supplied from the detection circuit DCP1, as an area AR2 illustrated by enlarging the area AR1.

The display device according to the present first embodiment includes the detection unit SE (see FIG. 1) having the touch detection function. As illustrated in FIGS. 14 and 15, in the display device according to the present first embodiment, the detection unit SE performs step S1 as a finger proximity detection process of detecting proximity or contact of a finger, and step S2 as a finger coordinate detection process of detecting coordinates of a finger in proximity or in contact.

Here, in a case in which step S1 as the finger proximity detection process is referred to as a standby mode and step S2 as the finger coordinate detection process is referred to as a detection mode, the detection unit SE performs the finger proximity detection process as the standby mode before the finger coordinate detection process as the detection mode.

In step S1, the detection unit SE first detects the shield electrode SH (step S11 in FIG. 15). In this step S11, the detection unit SE detects proximity or contact of an object such as a finger to the touch detection surface TDS from above by detecting a change in the electrostatic capacitance of one shield electrode SH integrally formed. In other words, in step S11, based on a change in the electrostatic capacitance of the shield electrode SH, proximity or contact of an object to the front surface FS of the display panel PNL from the first side (the upper side in FIG. 3) is detected.

In step S1, the detection unit SE next determines whether or not proximity of an object is detected (step S12 in FIG. 15). In this step S12, the detection unit SE determines whether or not proximity or contact of an object such as a finger to the touch detection surface TDS is detected. In step S12, when it is determined that proximity or contact of an object such as a finger is not detected in step S12, the detection unit SE waits for a while (S13 in FIG. 15). Then, after performing step S13 and waiting for a while, the detection unit SE repeats step S11. In contrast, when it is determined that proximity or contact of an object such as a finger is detected in step S12, the detection unit SE performs step S2.

In step S2, first, the detection unit SE individually detects each detection electrode Rx (step S21 in FIG. 15). In this step S21, the detection unit SE detects the position, that is, the coordinates of the object such as a finger on the touch detection surface TDS by individually detecting a change in the electrostatic capacitance of each of the plurality of detection electrodes Rx. In other words, in step S21, based on a change in the electrostatic capacitance of each of the plurality of detection electrodes Rx, the position of the object brought in proximity to or into contact with the front surface FS from the first side (the upper side in FIG. 3) is detected.

In step S2, next, the detection unit SE determines whether or not the coordinates of the object are detected (step S22 in FIG. 15). In this step S22, it is determined whether or not the coordinates of the object such as a finger on the touch detection surface TDS are detected. When the coordinates of the object such as a finger are detected in step S22, the detection unit SE repeats step S21. In contrast, in a case in which the coordinates of the object such as a finger are not detected in step S22, the detection unit SE repeats step S1, that is, step S11.

Note that FIG. 14 illustrates a case of detecting a change in the electrostatic capacitance of one shield electrode SH formed as an integrated body in step S11. However, as will be described later with reference to FIG. 24, a change in the electrostatic capacitance of each of the plurality of shield electrodes SH formed to be divided from each other may be detected.

Figure 17:
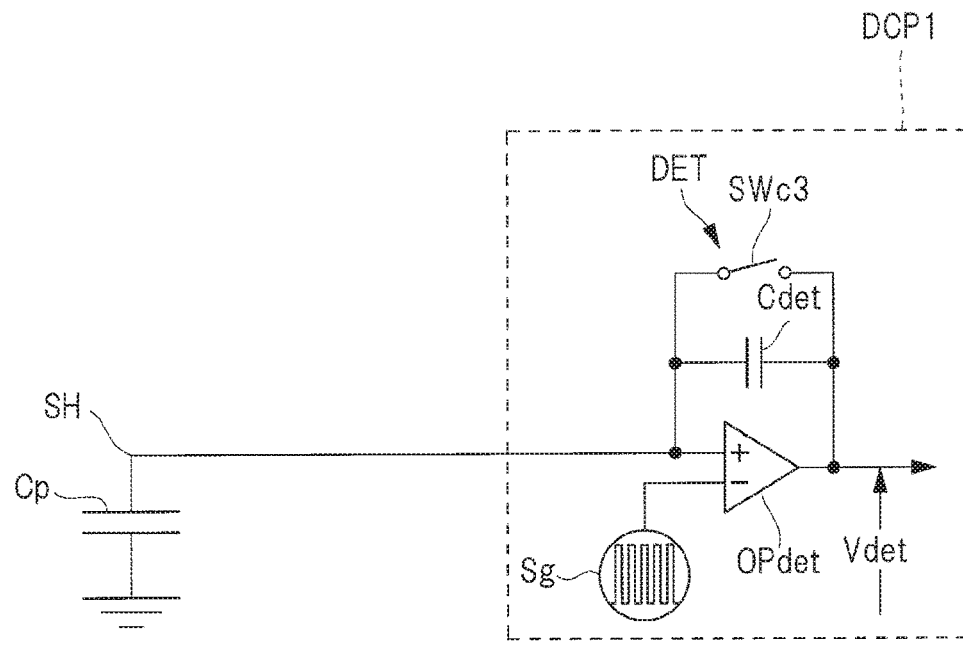
FIG. 17 is a diagram for describing touch detection using a shield electrode.
Figure 18:
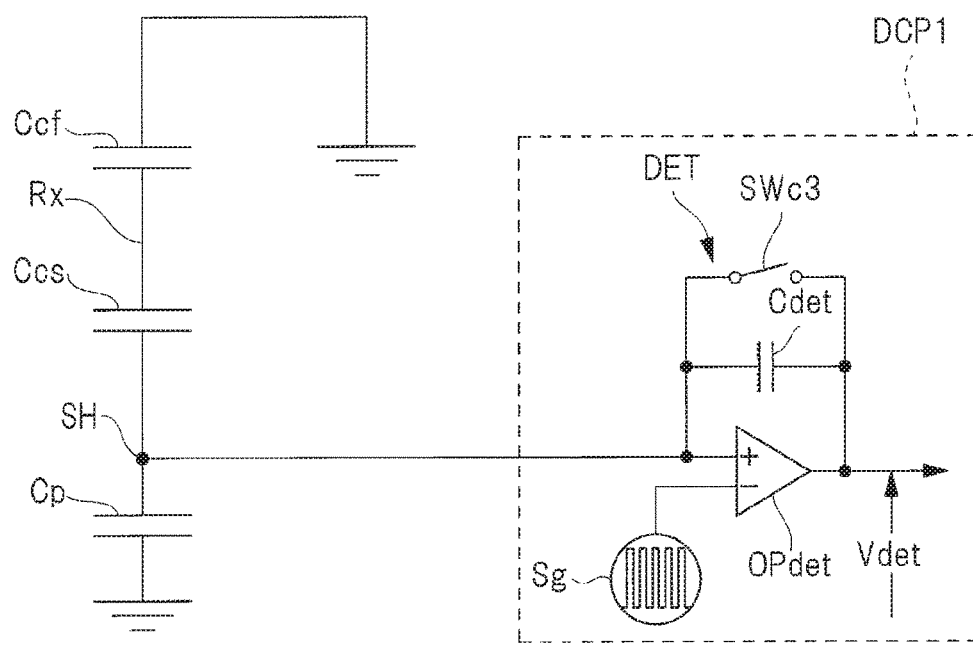
FIG. 18 is a diagram for describing the touch detection using the shield electrode.

Next, the touch detection circuit in the display device according to the first embodiment will be described with reference to FIGS. 16 to 18. FIG. 16 is a diagram illustrating the touch detection circuit in the display device according to the first embodiment. FIG. 17 and FIG. 18 are diagrams for describing touch detection using a shield electrode. FIG. 16 illustrates a state where the shield electrode SH is connected to the detection circuit DCP2 in step S11 by hatching the shield electrode SH. FIG. 17 illustrates a state where an object such as a finger is neither in contact with nor in proximity to the touch detection surface of the display device. FIG. 18 illustrates a state where an object such as a finger is in contact with or in proximity to the touch detection surface of the display device.

Note that, in FIGS. 17 and 18, the shield electrode SH is connected to the voltage detector DET as the integrating circuit. The voltage detector DET is an example similar to, for example, the detection circuit DCP1 described with reference to FIG. 11. For example, the voltage detector DET includes the operational amplifier OPdet, the capacitor Cdet, and the switch SWc3. The AC rectangular wave Sg is input to the operational amplifier OPdet.

Figure 16:
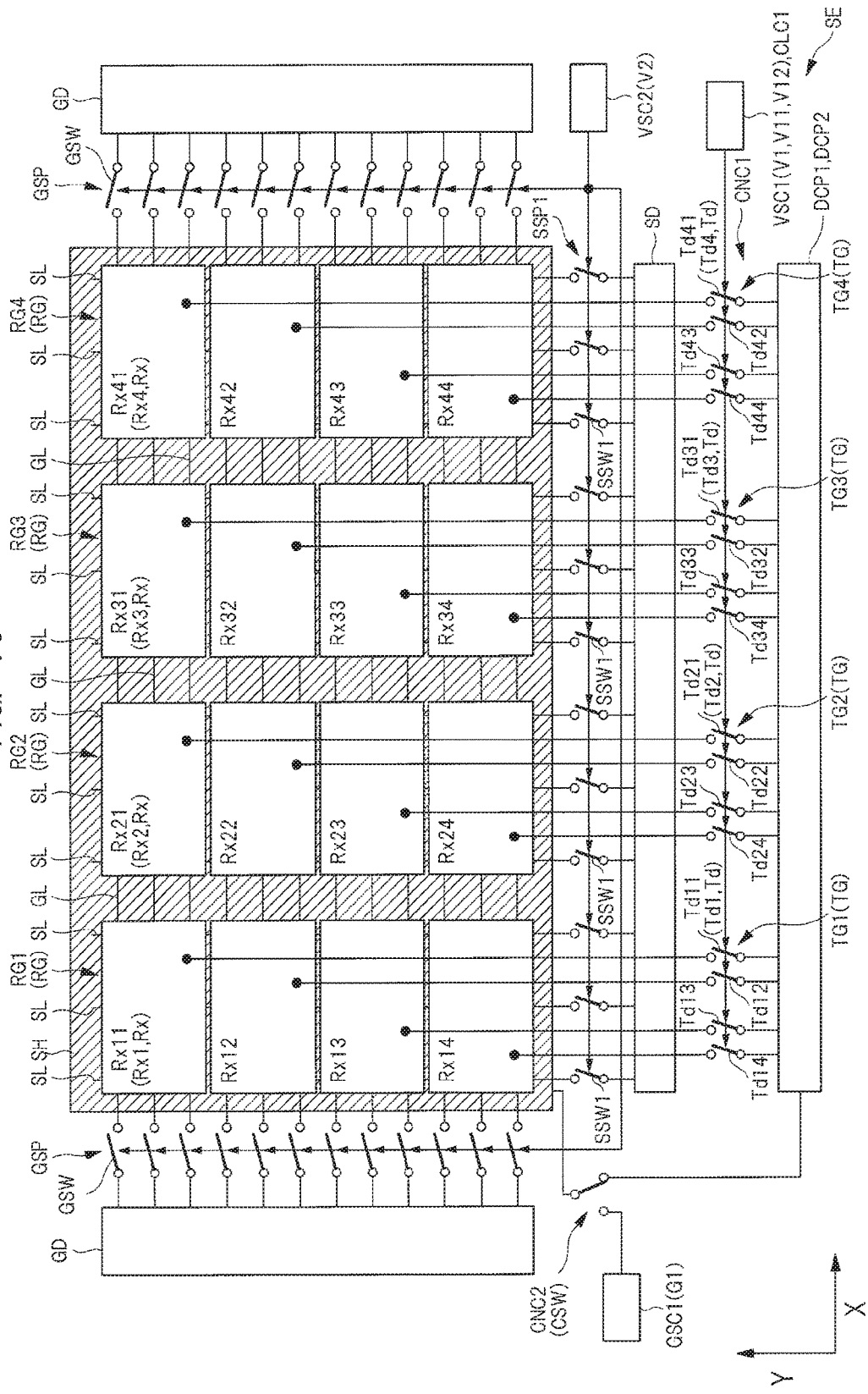
FIG. 16 is a diagram illustrating a touch detection circuit in the display device according to the first embodiment.

As illustrated in FIG. 16, the detection unit SE as the touch detection circuit includes the detection circuits DCP1 and DCP2, connection circuits CNC1 and CNC2, and a guard signal supply circuit GSC1. The detection circuit DCP1 detects a change in the electrostatic capacitance of each of the plurality of detection electrodes Rx. The detection circuit DCP2 detects a change in the electrostatic capacitance of the shield electrode SH. The connection circuit CNC1 switchably connects each of the plurality of detection electrodes Rx to the detection circuit DCP1, and the connection circuit CNC2 switchably connects the shield electrode SH to the detection circuit DCP2. Note that, as illustrated in FIG. 16, the shield electrode SH overlaps each of the plurality of detection electrodes Rx when seen in a plan view, and the shield electrode SH overlaps each of the plurality of scan lines and signal lines when seen in a plan view. In addition, the connection circuit CNC1 is a switching unit switching the connection state between the detection circuit DCP1 and the plurality of detection electrodes Rx.

Note that, in the example illustrated in FIG. 16, although the detection circuit DCP1 and the detection circuit DCP2 are illustrated in an integrated manner, the detection circuit DCP2 may not be provided, and the detection circuit DCP1 may detect a change in the electrostatic capacitance of the shield electrode SH. In addition, the connection circuit CNC2 may be provided integrally with the connection circuit CNC1, or the connection circuit CNC2 may not be provided, and the connection circuit CNC1 may switchably connect the shield electrode SH to the detection circuit DCP2.

An electrode group including a plurality of detection electrodes Rx arrayed in the Y-axis direction when seen in a plan view is referred to as an electrode group RG. In this case, the display device includes a plurality of electrode groups RG. The electrode groups RG are arrayed in the X-axis direction when seen in a plan view, and each of the plurality of electrode groups RG includes a plurality of detection electrodes Rx arrayed in the Y-axis direction when seen in a plan view.

In the example illustrated in FIG. 16, as the electrode groups RG, an electrode group RG1 including detection electrodes Rx11, Rx12, Rx13, and Rx14, and an electrode group RG2 including detection electrodes Rx21, Rx22, Rx23, and Rx24 are provided. In addition, as the electrode groups RG, an electrode group RG3 including detection electrodes Rx31, Rx32, Rx33, and Rx34, and an electrode group RG4 including detection electrodes Rx41, Rx42, Rx43, and Rx44 are provided. That is, the electrode group RG1 includes a plurality of detection electrodes Rx1, the electrode group RG2 includes a plurality of detection electrodes Rx2, the electrode group RG3 includes a plurality of detection electrodes Rx3, and the electrode group RG4 includes a plurality of detection electrodes Rx4.

Preferably, the connection circuit CNC1 includes a plurality of transistor groups TG each connecting each of the plurality of electrode groups RG to the detection circuit DCP1. Each of the plurality of transistor groups TG includes a plurality of transistors Td. Each of the plurality of transistors Td is a field effect transistor as a switching element, and each of the plurality of transistors Td includes a gate electrode. In a set of the electrode group RG and the transistor group TG, each of the plurality of transistors Td included in the transistor group TG connects each of the plurality of detection electrodes Rx included in the electrode group RG to the detection circuit DCP1.

In the example illustrated in FIG. 16, the connection circuit CNC1 includes as the transistors Td, transistors Td11, Td12, Td13, and Td14 included in the transistor group TG1, and transistors Td21, Td22, Td23, and Td24 included in the transistor group TG2. In addition, the connection circuit CNC1 includes as the transistors Td, transistors Td31, Td32, Td33, and Td34 included in the transistor group TG3, and transistors Td41, Td42, Td43, and Td44 included in the transistor group TG4.

The transistor Td11 connects the detection electrode Rx11 to the detection circuit DCP1, the transistor Td12 connects the detection electrode Rx12 to the detection circuit DCP1, the transistor Td13 connects the detection electrode Rx13 to the detection circuit DCP1, and the transistor Td14 connects the detection electrode Rx14 to the detection circuit DCP1. The transistor Td21 connects the detection electrode Rx21 to the detection circuit DCP1, the transistor Td22 connects the detection electrode Rx22 to the detection circuit DCP1, the transistor Td23 connects the detection electrode Rx23 to the detection circuit DCP1, and the transistor Td24 connects the detection electrode Rx24 to the detection circuit DCP1.

The transistor Td31 connects the detection electrode Rx31 to the detection circuit DCP1, the transistor Td32 connects the detection electrode Rx32 to the detection circuit DCP1, the transistor Td33 connects the detection electrode Rx33 to the detection circuit DCP1, and the transistor Td34 connects the detection electrode Rx34 to the detection circuit DCP1. The transistor Td41 connects the detection electrode Rx41 to the detection circuit DCP1, the transistor Td42 connects the detection electrode Rx42 to the detection circuit DCP1, the transistor Td43 connects the detection electrode Rx43 to the detection circuit DCP1, and the transistor Td44 connects the detection electrode Rx44 to the detection circuit DCP1.

In addition, preferably, the detection unit SE includes voltage supply circuits VSC1 and VSC2, and a clock signal supply circuit CLC1.

The voltage supply circuit VSC1 supplies a voltage V1 which is a gate voltage of the transistor Td to each of the plurality of transistor groups TG. That is, the voltage supply circuit VSC1 supplies a voltage V11 or a voltage V12 as the voltage V1 to the gate electrode of each of the plurality of transistors Td included in each of the plurality of transistor groups TG. When the voltage V11 is input to the gate electrode, the transistor Td is in an on-state (conductive state). When the voltage V12 is input to the gate electrode, the transistor Td is in an off-state (non-conductive state).

Note that, as the voltage supply circuit VSC1, various circuits such as a shift register circuit, a multiplexer circuit, and a decoder circuit may be used, for example.

The guard signal supply circuit GSC1 supplies to the shield electrode SH a signal G1 as a guard signal for preventing a change in the electrostatic capacitance of each of the plurality of detection electrodes Rx from being influenced by the shield electrode SH in step S21. The connection circuit CNC2 connects the shield electrode SH to the detection circuit DCP2 or the guard signal supply circuit GSC1 in a switchable manner.

In the example illustrated in FIG. 16, the connection circuit CNC2 includes one switching element CSW as a field effect transistor. The one switching element CSW connects the shield electrode SH to the detection circuit DCP2.

The display device DSP includes the plurality of scan lines GL, the scan line drive circuit GD, the signal line drive circuit SD, the switching unit GSP, and a switching unit SSP1. The plurality of scan lines GL overlap the plurality of electrode groups RG, that is, the plurality of detection electrodes Rx when seen in a plan view. The plurality of signal lines SL overlap the plurality of electrode groups RG, that is, the plurality of detection electrodes Rx when seen in a plan view.

The switching unit GSP switches the connection state between the scan line drive circuit GD and the plurality of scan lines GL. The switching unit GSP includes the plurality of switching elements GSW as field effect transistors. Each of the plurality of switching elements GSW connects each of the plurality of scan lines GL to the scan line drive circuit GD. Each of the plurality of switching elements GSW includes a gate electrode, and an output of the voltage supply circuit VSC2 is input to the gate electrode of each of the plurality of switching elements GSW. The switching element GSW is in an off-state when the voltage V2 is input to the gate electrode.

Note that, as illustrated in FIG. 16, in a case in which the scan line drive circuits GD are provided on both ends of each of the plurality of scan lines GL, the switching units GSP may be provided on both ends of each of the plurality of scan lines GL in order to put each of the plurality of scan lines GL into an electrically floating state.

The switching unit SSP1 switches the connection state between the signal line drive circuit SD and the plurality of signal lines SL. The switching unit SSP1 includes a plurality of switching elements SSW1 as field effect transistors. Each of the plurality of switching elements SSW1 connects each of the plurality of signal lines SL to the signal line drive circuit SD. Each of the plurality of switching elements SSW1 includes a gate electrode, and the output of the voltage supply circuit VSC2 is input to the gate electrode of each of the plurality of switching elements SSW1. The switching element SSW1 is in an off-state when voltage V2 is input to the gate electrode.

In step S11 included in step S1 as the finger proximity detection process, the detection unit SE connects the shield electrode SH to the detection circuit DCP2 by the connection circuit CNC2. Thus, the detection unit SE detects a change in the electrostatic capacitance of the one shield electrode SH integrally formed, by the detection circuit DCP2.

In addition, in step S11, the detection unit SE supplies the voltage V12 as the voltage V1 by the voltage supply circuit VSC1 and supplies the voltage V2 by the voltage supply circuit VSC2. As described above, the transistor Td is in the off-state when the voltage V12 as the voltage V1 is input to the gate electrode. In addition, each of the plurality of switching elements GSW is in the off-state when the voltage V2 is input to the gate electrode. Each of the plurality of switching elements SSW is in the off-state when the voltage V2 is input to the gate electrode.

Therefore, the voltage supply circuit VSC1 supplies the voltage V12, and then, the connection circuit CNC1 as the switching unit cuts off each of the plurality of detection electrodes Rx from the detection circuit DCP1 and puts the detection electrode Rx in an electrically floating state. In addition, the voltage supply circuit VSC2 supplies the voltage V2, and then each of the plurality of scan lines GL is cut off from the scan line drive circuit GD and is put into an electrically floating state, and each of the plurality of signal lines SL is cut off from the signal line drive circuit SD and is put into an electrically floating state.

Thus, in step S11, the state where each of the plurality of detection electrodes Rx, the plurality of scan lines GL, and the plurality of signal lines SL is in an electrically floating state is considered. In such a state, in a case in which an object such as a finger is neither in contact with nor in proximity to the touch detection surface of the display device, as illustrated in FIG. 17, only the capacitor Cp as a parasitic capacitance of the shield electrode SH is detected by the detection circuit DCP1. In contrast, in a case in which an object such as a finger is in contact with or in proximity to the touch detection surface of the display device, as illustrated in FIG. 18, in addition to the capacitor Cp, a capacitor Ccs between the shield electrode SH and the detection electrode Rx and a capacitor Ccf between the detection electrode Rx and the object such as a finger are detected by the detection circuit DCP1. Among the capacitors Cp, Ccs, and Ccf, the capacitors Cp and Ccs do not change depending on presence or absence of an object in contact or in proximity; however, the capacitor Ccf changes depending on presence or absence of an object in contact or in proximity. Therefore, the detection unit SE performs step S11 in the state where each of the plurality of detection electrodes Rx, the plurality of scan lines GL, and the plurality of signal lines SL is in an electrically floating state by the connection circuit CNC1, and can detect presence or absence of an object in contact or in proximity based on a change in the electrostatic capacitance of the shield electrode SH detected by the detection circuit DCP1.

In addition, by performing step S11 in the state where each of the plurality of detection electrodes Rx, the plurality of scan lines GL, and the plurality of signal lines SL is in an electrically floating state, of parasitic capacitances of the shield electrode SH, a parasitic capacitance of the shield electrode SH obtained via the scan line GL or the signal line SL can be reduced. Therefore, detection accuracy when step S11 is performed can be improved, and power consumption when step S11 is performed can be reduced.

Note that, in step 11, even in a state where each of the plurality of detection electrodes Rx, the plurality of scan lines GL, and the plurality of signal lines SL is not in an electrically floating state, the capacitors Cp, Ccs, and Ccf can be detected. However, in step 11, in the state where each of the plurality of detection electrodes Rx, the plurality of scan lines GL, and the plurality of signal lines SL is in an electrically floating state, the capacitors Cp, Ccs, and Ccf can be detected more accurately. Note that a change in the electrostatic capacitance of the shield electrode SH may be detected by the detection circuit DCP1 in a state where each of one or two kinds of the plurality of detection electrodes Rx, the plurality of scan lines GL, and the plurality of signal lines SL is in an electrically floating state.

In addition, in step S11, as will be described later with reference to FIG. 27 in a third modification example of the first embodiment, for example, the shield electrode SH may be spaced apart from the substrate SUB1, that is, the insulating substrate 10. In such a case, an object such as a finger is brought into contact with the touch detection surface, the substrate SUB1 warps, and the distance between the shield electrode SH and another conductive member other than the shield electrode SH, for example, an object such as a finger, each of the plurality of detection electrodes Rx, or the like, changes, so that the capacitors Ccs and Ccf change. Therefore, it is also possible to use the shield electrode SH as a pressure sensor.

In contrast, in step S21 included in step S2 as the finger coordinate detection process, the detection unit SE selects one transistor group TG among the plurality of transistor groups TG, and supplies the voltage V11 as the voltage V1 from the voltage supply circuit VSC1 to the gate electrode of each of the plurality of transistors Td included in the selected transistor group TG. As described above, the transistor Td is in an on-state when the voltage V11 as the voltage V1 is input to the gate electrode. Then, the voltage supply circuit VSC1 supplies the voltage V11, and then the voltage V11 is input to the gate electrode of each of the plurality of transistors Td included in the selected transistor group TG.

Thus, each of the plurality of transistors Td included in the selected transistor group TG is turned on, and each of the plurality of detection electrodes Rx included in one of the plurality of electrode groups RG is connected to the detection circuit DCP1 by each of the plurality of transistors Td included in the selected transistor group TG. Then, in step S21, the detection unit SE sequentially switches the plurality of detection electrodes Rx one by one or in groups and connects the detection electrode Rx or the detection electrodes Rx to the detection circuit DCP1 by the connection circuit CNC1 as a switching unit, and therefore the detection unit SE individually detects the electrostatic capacitance of each of the plurality of detection electrodes Rx.

In contrast, in step S21, the detection unit SE connects the shield electrode SH to the guard signal supply circuit GSC1 by the connection circuit CNC2. Then, in step S21, the detecting unit SE supplies to the shield electrode SH the signal G1 as the guard signal for preventing a change in the electrostatic capacitance of each of the plurality of detection electrodes Rx from being influenced by the shield electrode SH.

As the guard signal, for example, a signal of the same phase as that of a driving signal supplied from the detection circuit DCP1 to the detection electrode Rx which has been selected can be used. Thus, it is possible to prevent a change in the electrostatic capacitance of each of the plurality of detection electrodes Rx from being influenced by the shield electrode SH.

Note that, when a detection electrode Rx which has been selected is referred to as a selected detection electrode Rxs (see FIG. 14) and a detection electrode Rx which is not selected is referred to as a non-selected detection electrode Rxu (see FIG. 14), in step S21, the guard signal may be supplied to the non-selected detection electrode Rxu. Therefore, a change in the electrostatic capacitance of the detection electrode Rx which has been selected can be prevented from being influenced by the detection electrode Rx which is not selected.

Figure 19:
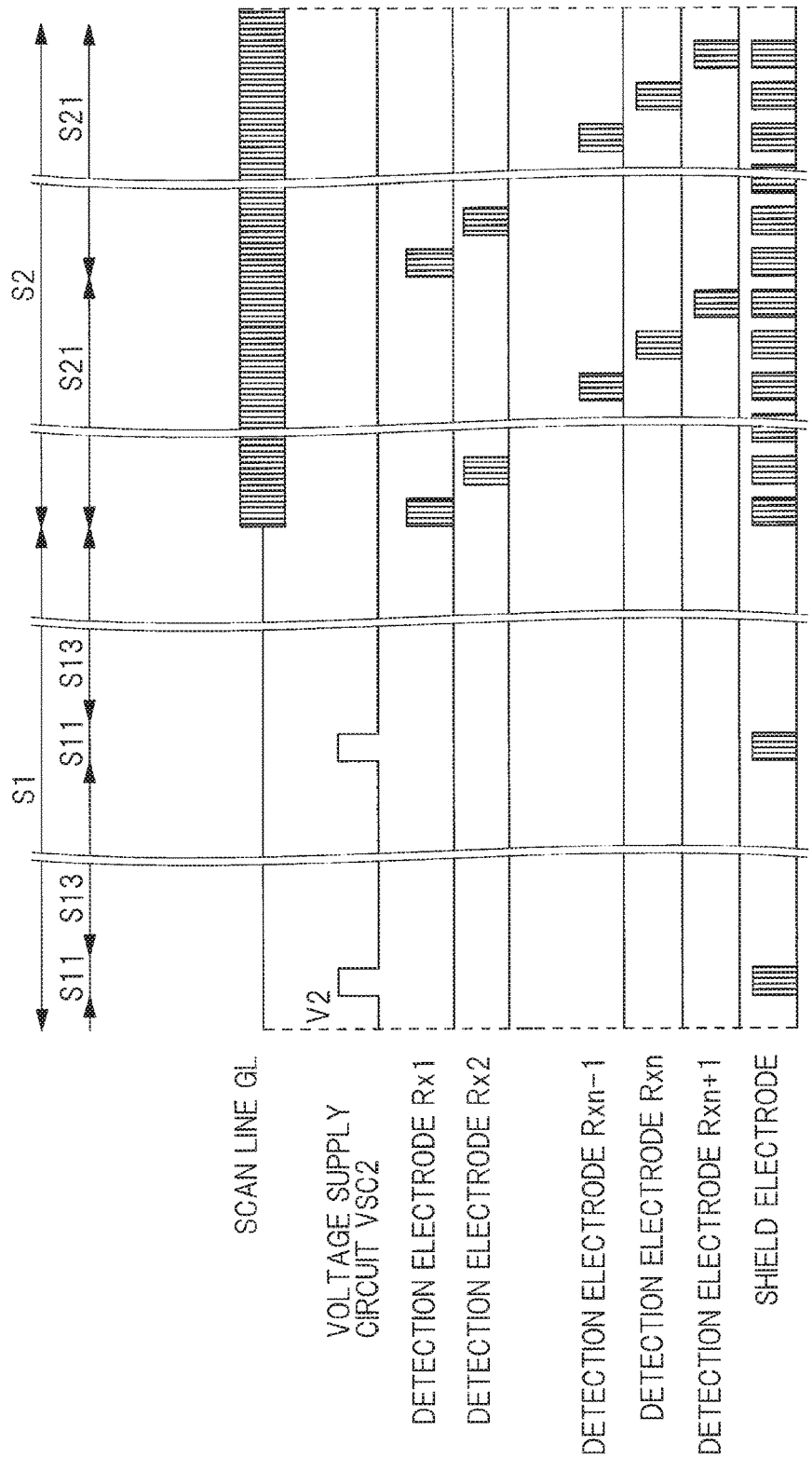
FIG. 19 is a timing chart for describing a finger proximity detection process in a touch detection process in the display device according to the first embodiment.

Next, a timing chart of the touch detection process in the display device according to the present first embodiment will be described with reference to FIG. 19. FIG. 19 is a timing chart for describing a finger proximity detection process in the touch detection process in the display device according to the first embodiment. FIG. 19 illustrates the timing chart when steps S11 and S13 are performed twice for each step, and step S21 is performed twice. FIG. 19 schematically illustrates a voltage of the scan line GL, an output of the voltage supply circuit VSC2, detection waveforms of the detection electrodes Rx1, Rx2, Rxn−1, Rxn, and Rxn+1 included in the electrode groups RG (see FIG. 16) in a first row, a second row, an (n−1)th row, an nth row, and an (n+1)th row, respectively, when it is assumed that n is an integer greater than or equal to two, and a detection waveform of the shield electrode SH. Note that, similarly to the area AR2 illustrated by enlarging the area AR1 in FIG. 14, the hatched portion in FIG. 19 is a portion in which, for example, a signal having a rectangular wave is detected or to which the signal is applied. In addition, in FIG. 19, also in a case in which the voltage of the signal line SL (see FIG. 16) is illustrated instead of the voltage of the scan line GL, the voltage of the signal line SL can be set to the same voltage as that of the scan line GL illustrated in FIG. 19.

As illustrated in FIG. 19, in step S11, each of the plurality of detection electrodes Rx and the plurality of scan lines GL are in an electrically floating state, and no signal is input to each of the plurality of detection electrodes Rx and the plurality of scan lines GL. In addition, in step S11, the voltage V2 is supplied from the voltage supply circuit VSC2, a driving waveform is supplied from the detection circuit DCP2 (see FIG. 16), and the detection waveform of the shield electrode SH is detected.

In contrast, as illustrated in FIG. 19, in step S13, the voltage V2 is not supplied from the voltage supply circuit VSC2, the driving waveform is not supplied from the detection circuit DCP2, and the detection waveform of the shield electrode SH is not detected.

That is, in step S11, the detection unit SE cuts off each of the plurality of detection electrodes Rx from the detection circuit DCP1 by the connection circuit CNC1, and connects the shield electrode SH to the detection circuit DCP2 by the connection circuit CNC2, thereby detecting the electrostatic capacitance of the shield electrode SH. In contrast, in step S13, the detection unit SE does not detect a change in the electrostatic capacitance of the shield electrode SH.

Thus, in the present first embodiment, since the detection unit SE, in step S11, detects a change in the electrostatic capacitance of the one shield electrode SH integrally formed, detection time can be shortened, and power consumption can be reduced. In addition, since step S11 is performed in the state where each of the plurality of detection electrodes Rx, the plurality of scan lines GL, and the plurality of signal lines SL is in an electrically floating state, the detection accuracy when step S11 is performed can be improved, and power consumption when step S11 is performed can be reduced.

<Touch Detection Method and Touch Detection Circuit according to Comparative Example>

Next, a touch detection method and a touch detection circuit according to a comparative example will be described, and problems in the touch detection method and the touch detection circuit according to the comparative example will be described.

Figure 20:
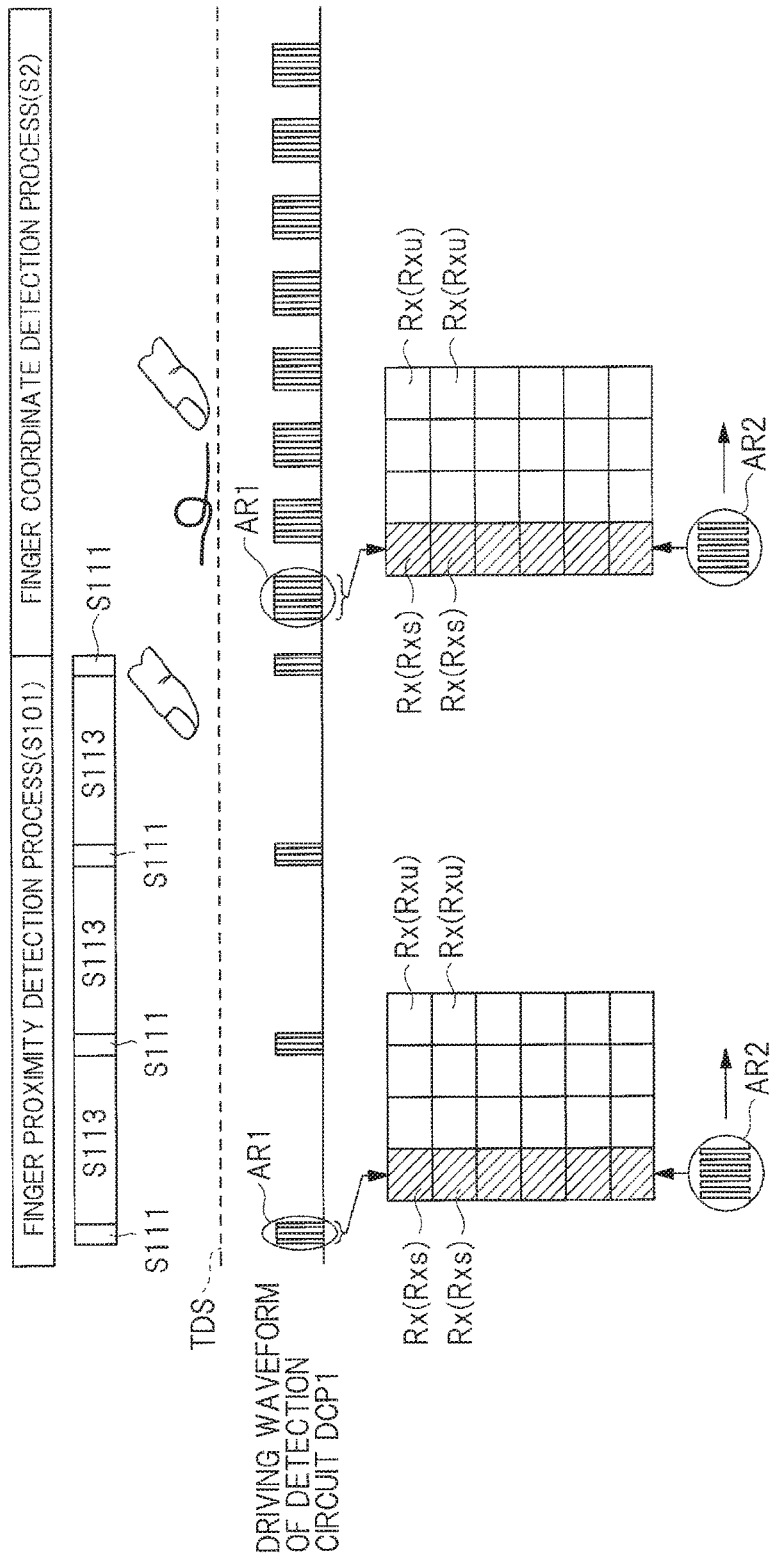
FIG. 20 is a diagram for describing a touch detection method in a display device according to a comparative example.
Figure 21:
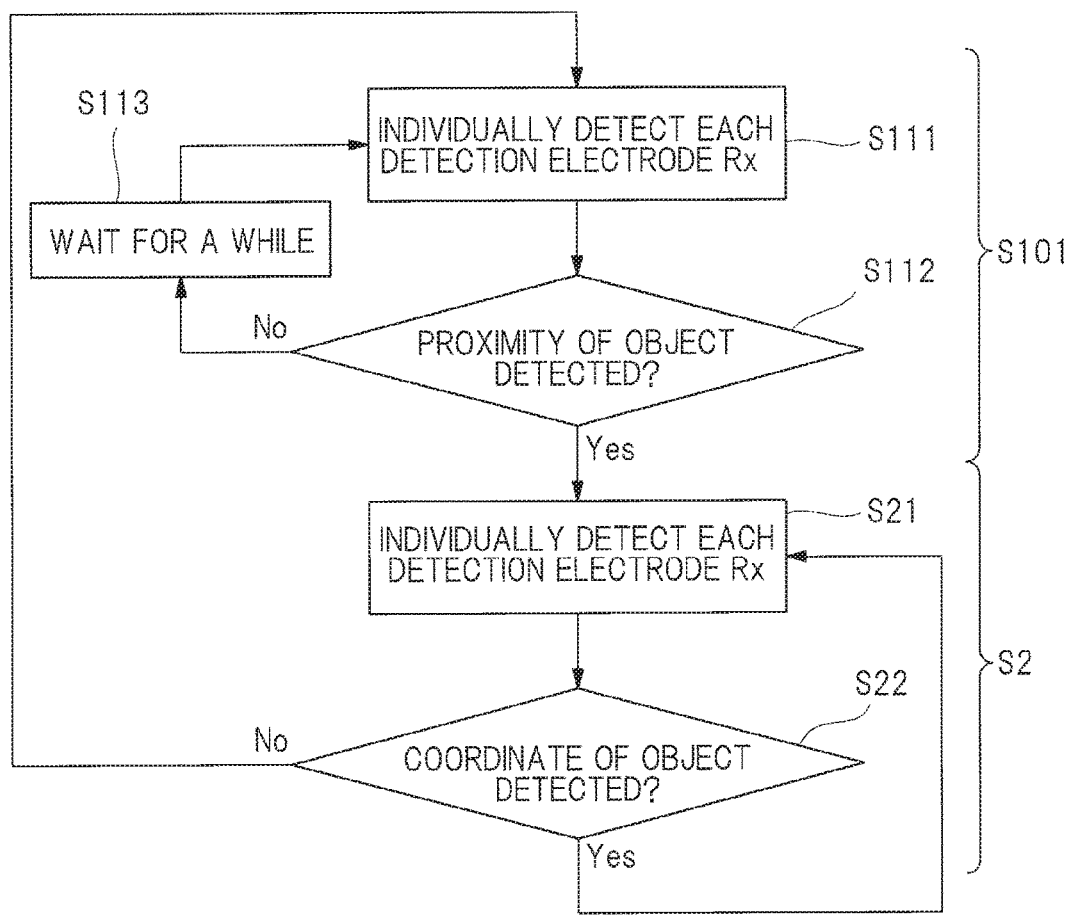
FIG. 21 is a flow diagram for describing the touch detection method in the display device according to the comparative example.

First, a touch detection method in a display device according to the comparative example will be described. FIG. 20 is a diagram for describing the touch detection method in the display device according to the comparative example. FIG. 21 is a flow diagram for describing the touch detection method in the display device according to the comparative example Note that, in FIG. 20, an area AR1 which is a hatched portion in FIG. 20 is a portion to which a driving signal having, for example, a rectangular wave is supplied from a detection circuit DCP1, as an area AR2 illustrated by enlarging the area AR1.

As illustrated in FIGS. 20 and 21, in the display device according to the comparative example, a detection unit SE performs step S101 as a finger proximity detection process of detecting proximity or contact of a finger, and step S2 as a finger coordinate detection process of detecting coordinates of a finger in proximity or in contact.

Here, in a case in which step S101 as the finger proximity detection process is referred to as a standby mode and step S2 as the finger coordinate detection process is referred to as a detection mode, also in the comparative example, the detection unit SE performs the finger proximity detection process as the standby mode before the finger coordinate detection process as the detection mode.

In step S101, the detection unit SE first individually detects each detection electrode Rx (step S111 in FIG. 21). In this step S111, different from step S11 in FIG. 15, the detection unit SE detects proximity or contact of an object such as a finger to a touch detection surface TDS by individually detecting a change in electrostatic capacitance of each of the plurality of detection electrodes Rx.

In step S101, the detection unit SE next determines whether or not proximity of an object is detected (step S112 in FIG. 21). In this step S112, the detection unit SE determines whether or not proximity or contact of an object to the touch detection surface TDS is detected. In step S112, when it is determined that proximity or contact of an object such as a finger is not detected in step S112, the detection unit SE waits for a while (step S113 in FIG. 21). Then, after performing step S113 and waiting for a while, the detection unit SE repeats step S111. In contrast, in a case in which it is determined that proximity or contact of an object such as a finger is detected in step S112, the detection unit SE performs step S2.

Step S2 can be similar to step S2 in FIG. 15.

Figure 22:
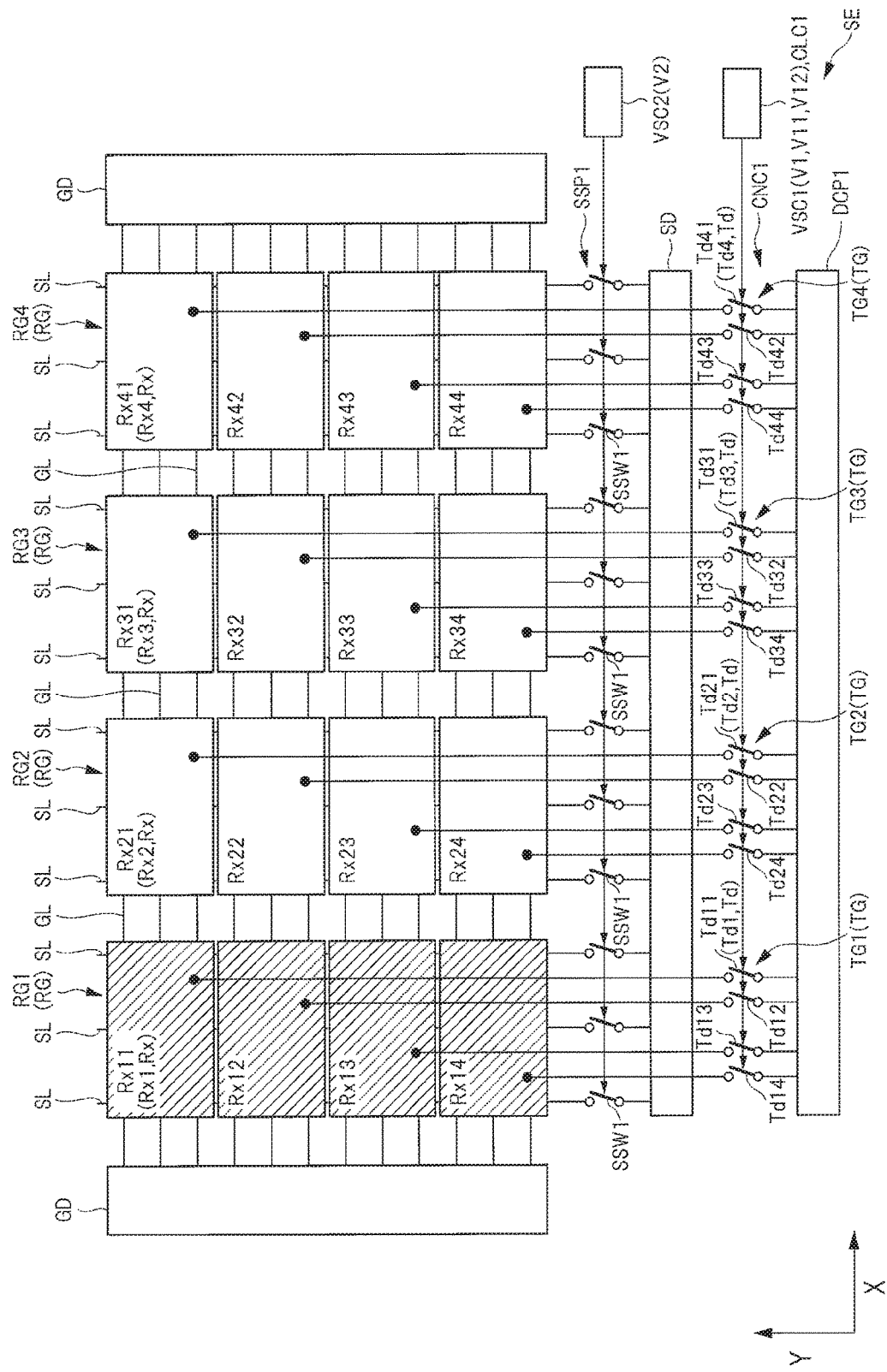
FIG. 22 is a diagram illustrating a touch detection circuit in the display device according to the comparative example.

Next, a touch detection circuit in the display device according to the comparative example will be described with reference to FIG. 22. FIG. 22 is a diagram illustrating the touch detection circuit in the display device according to the comparative example. Note that FIG. 22 illustrates the case where detection electrodes Rx11, Rx12, Rx13, and Rx14 included in an electrode group RG1 are selected in step S111 by hatching the detection electrodes Rx11, Rx12, Rx13, and Rx14.

The display device according to the comparative example is different from the display device according to the first embodiment in that the display device according to the comparative example does not include a shield electrode SH (see FIG. 16). In addition, the display device according to the comparative example is different from the display device according to the first embodiment in that the detection unit SE does not include a detection circuit DCP2, a connection circuit CNC2, and a switching unit GSP (see FIG. 16). That is, in the same manner as in the display device according to the first embodiment, in the display device according to the comparative example, the detecting unit SE includes a detection circuit DCP1 and a connection circuit CNC1. However, different from the detection unit SE in the display device according to the first embodiment, the detection unit SE in the display device according to the comparative example does not include the detection circuit DCP2, the connection circuit CNC2, and the switching unit GSP (see FIG. 16).

In step S111 included in step S101 as the finger coordinate detection process, the detection unit SE selects one transistor group TG among a plurality of transistor groups TG, and supplies a voltage V11 as a voltage V1 from a voltage supply circuit VSC1 to a gate electrode of each of a plurality of transistors Td included in the selected transistor group TG. As described above, the transistor Td is in an on-state when the voltage V11 as the voltage V1 is input to the gate electrode. Therefore, the voltage supply circuit VSC1 supplies the voltage V11 as the voltage V1, and therefore the voltage V11 is input to the gate electrode of each of the plurality of transistors Td included in the selected transistor group TG. In contrast, in step S11, the voltage V11 is not input to the gate electrode of each of the plurality of transistors Td included in the transistor group TG not selected.

Figure 23:
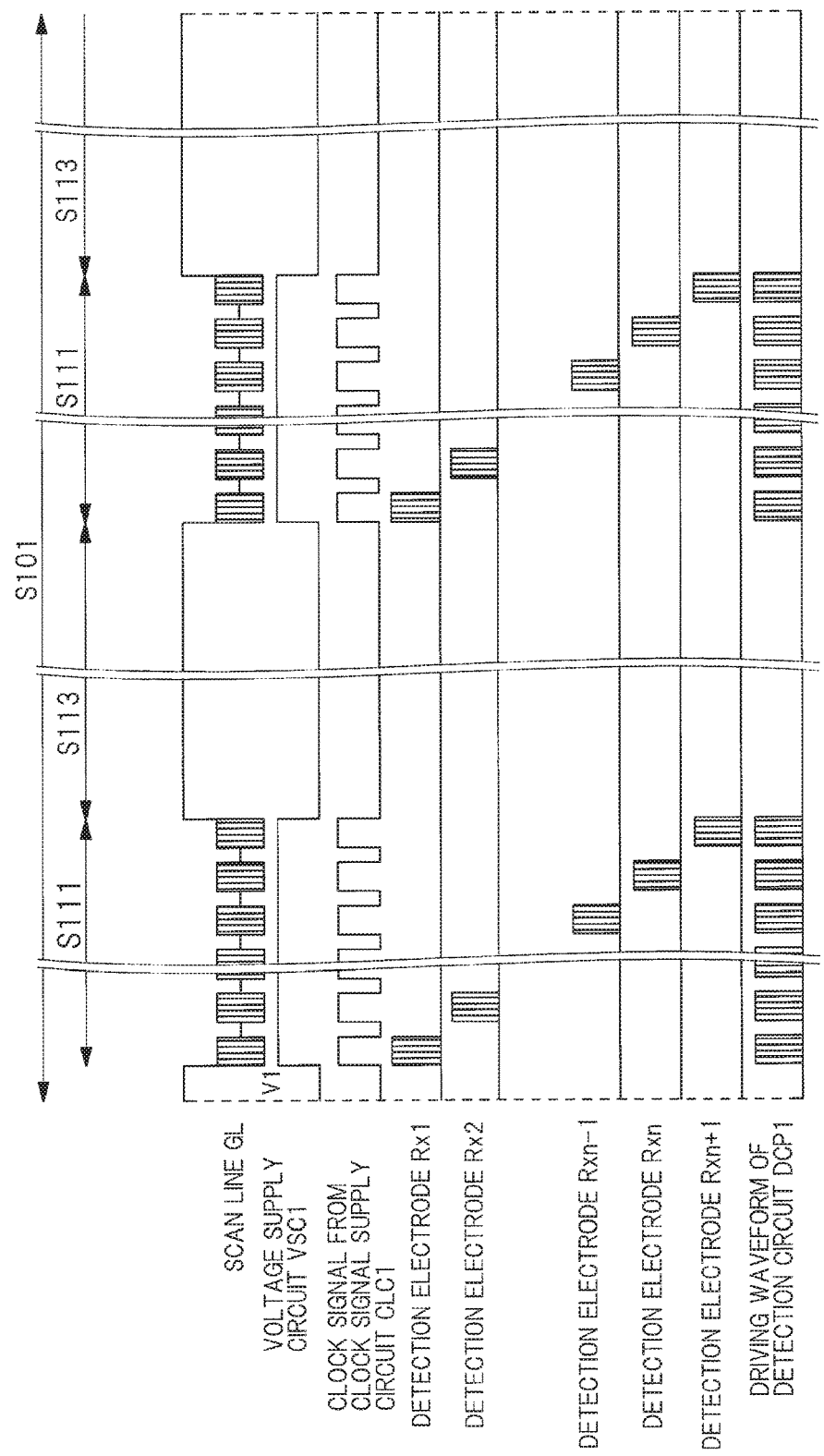
FIG. 23 is a timing chart for describing a finger proximity detection process in a touch detection process in the display device according to the comparative example.

Next, a timing chart in the touch detection process in the display device according to the comparative example will be described with reference to FIG. 23. FIG. 23 is a timing chart for describing a finger proximity detection process in the touch detection process in the display device according to the comparative example. FIG. 23 illustrates a timing chart when steps S111 and S113 are performed twice for each step. FIG. 23 schematically illustrates a voltage of a scan line GL, an output of the voltage supply circuit VSC1, and a clock signal from a clock signal supply circuit CLC1. In addition, FIG. 23 schematically illustrates detection waveforms of detection electrodes Rx1, Rx2, Rxn−1, Rxn, and Rxn+1 included in the electrode groups RG (see FIG. 22) in a first row, a second row, a third row, an (n−1)th row, an nth row, and an (n+1)th row, respectively, when it is assumed that n is an integer greater than or equal to two, and a driving waveform of the detection circuit DCP1. Note that, similarly to the area AR2 illustrated by enlarging the area AR1 in FIG. 20, the hatched portion in FIG. 23 is a portion in which a signal having a rectangular wave is detected or to which the signal is applied, for example.

As illustrated in FIG. 23, in step S111, the voltage V11 as the voltage V1 is supplied from the voltage supply circuit VSC1, and a driving waveform is supplied from the detection circuit DCP1 in synchronization with the clock signal from the clock signal supply circuit CLC1. Then, the detection waveforms of the detection electrodes Rx1, Rx2, Rxn−1, Rxn, and Rxn+1 are sequentially detected in synchronization with the clock signal from the clock signal supply circuit CLC1. Note that, in step S111, a signal as a guard signal may be supplied from a guard signal supply circuit (illustration of which is omitted) to the detection electrodes Rx which are not selected in order to prevent a change in the electrostatic capacitance of the detection electrode Rx which has been selected from being influenced by the detection electrodes Rx which are not selected.

In contrast, although illustration is omitted in FIG. 23, in step S113, all of the plurality of transistors Td are turned off in step S113. In addition, in step S113, no driving waveform is supplied from the detection circuit DCP1. Furthermore, no detection waveforms of the detection electrodes Rx1, Rx2, Rxn−1, Rxn, and Rxn+1 are detected.

That is, in the same manner as in the display device according to the first embodiment, in the display device according to the comparative example, in step S113, the detection unit SE does not connect any of the plurality of detection electrodes Rx included in all of the plurality of electrode groups RG to the detection circuit DCP1, and does not detect change in the electrostatic capacitance of any of the plurality of detection electrodes Rx included in all of the plurality of electrode groups RG. However, different from the display device according to the first embodiment, in the display device according to the comparative example, in step S111, the electrostatic capacitance of each of the plurality of detection electrodes Rx is individually detected by sequentially switching the plurality of detection electrodes Rx one by one or in groups and connecting the detection electrode Rx or the detection electrodes Rx to the detection circuit DCP1 by the connection circuit CNC1.

In the display device according to the comparative example, in step S111, in the same manner as in step S21, for example, each of the plurality of electrode groups RG is sequentially selected, and a change in the electrostatic capacitance is detected with respect to the plurality of detection electrodes Rx included in the selected electrode group RG, that is, selected detection electrodes Rxs (see FIG. 20) that have been selected. Therefore, there is a problem that a longer time is taken for the detection process. In addition, since a longer time is taken for the detection process, in a case in which a time interval when step S111 is repeated is short, there is a problem that average power consumption increases in step S101.

In order to shorten the time taken for the detection process, in step S111, a method is considered which sequentially selects the electrode group RG used for the detection process from among some of the plurality of electrode groups RG, for example, selects every other electrode group RG instead of sequentially selecting the electrode group RG from among all of the plurality of electrode groups RG. According to such a method of sequentially selecting the electrode group RG from among some of the plurality of electrode groups RG, the time taken for the detection process is shorter in step S111. However, since not all of the plurality of electrode groups RG are used for detection, there is a possibility that a detection error of not detecting proximity or contact of an object such as a finger will occur even though the object is in proximity or in contact.

In addition, in order to reduce power consumption, a method is considered which increases a waiting time (step S113 in FIG. 21) for repeating step S111. However, since the time until proximity or contact of a finger is detected after the finger is brought in proximity to or into contact becomes longer, there is a possibility that a detection error of not detecting proximity or contact of the object such as a finger will occur even though the object is in proximity or in contact.

Note that, in the technique described in the above Patent Document 1, the input device includes a charge integration circuit supplying charges to the detection electrode such that a voltage between the detection electrode and the shield electrode is fixed and outputting a detection signal according to an integrated value of the supplied charges.

In the technique illustrated in the above Patent Document 1, the charge integration circuit supplies charges to the detection electrode such that the voltage between the detection electrode and the shield electrode is fixed, for example, zero, and outputs a detection signal according to the integrated value of the charges supplied to this detection electrode. Then, since the detection signal greatly changes when a finger or the like is brought in proximity to the detection electrode, presence or absence of proximity of a finger or the like to the detection electrode is distinguished. That is, the shield electrode described in the above Patent Document 1 is for supplying charges to the detection electrode such that the voltage between the detection electrode and the shield electrode is fixed in a finger coordinate detection process as a detection mode, and the shield electrode is not for detecting proximity or contact of an object such as a finger in a finger proximity detection process as a standby mode.

In addition, also in the technique described in the above Patent Document 1, since a change in electrostatic capacitance between each of the plurality of detection electrodes and the shield electrode is detected, in the finger proximity detection process performed as the standby mode before the finger coordinate detection process as the detection mode, it is not possible to prevent or suppress occurrence of a detection error while shortening the time taken for the detection process and reducing power consumption.

<Major Features of Present Embodiment>

Technical ideas in the display device according to the present first embodiment are for solving problems of the display device according to the comparative example as described, and for preventing or suppressing occurrence of a detection error while shortening the time taken for the detection process and reducing power consumption in the finger proximity detection process performed as the standby mode before the finger coordinate detection process as the detection mode.

That is, the display device according to the present first embodiment includes: the display panel PNL having the front surface FS on the first side (on the upper side in FIG. 3) and the back surface BS on the side (on the lower side in FIG. 3) opposite to the first side and displaying an image on the front surface FS; the plurality of detection electrodes Rx overlapping the display panel PNL when seen in a plan view; and the shield electrode SH overlapping the display panel PNL when seen in a plan view. The shield electrode SH is arranged on the side (on the lower side in FIG. 3) opposite to the first side with respect to the plurality of detection electrodes Rx. Based on the electrostatic capacitance of the shield electrode SH, proximity or contact of an object to the front surface FS from the first side (the upper side in FIG. 3) is detected, and the position of the object is detected based on the electrostatic capacitance of each of the plurality of detection electrodes Rx.

Thus, in the detection process (step S11 in FIG. 15) detecting proximity or contact of an object to the display panel from outside, a change in the electrostatic capacitance of the shield electrode SH can be detected. Therefore, the time taken for the detection process can be shortened. In addition, since the time taken for the detection process is shortened, even in a case in which the time interval when step S11 is repeated is short, average power consumption in the finger proximity detection process (step S1 in FIG. 15) can be reduced.

In the present first embodiment, in order to shorten the time taken for the detection process, in step S11, it is not necessary to sequentially select the electrode group RG used for the detection process from among some of the plurality of electrode groups RG, for example, to select every other electrode group RG. Therefore, it is possible to prevent or suppress occurrence of a detection error of not detecting proximity or contact of an object such as a finger even though the object is in proximity or in contact.

In addition, in the present first embodiment, since the time taken for step S11 is shortened, it is not necessary to increase a waiting time (step S13 in FIG. 15) for repeating step S11 in order to reduce power consumption. Therefore, since the time until proximity or contact of a finger is detected after the finger is brought in proximity to or into contact can be shortened, it is possible to prevent or suppress occurrence of a detection error of not detecting proximity or contact of an object such as a finger even though the object is in proximity or in contact.

That is, according to the display device of the present first embodiment, in the finger proximity detection process performed as the standby mode before the finger coordinate detection process as the detection mode, it is possible to shorten the time taken for the detection process, reduce power consumption, and prevent or suppress occurrence of a detection error.

Note that, according to the display device of the present first embodiment, since only the shield electrode SH is used among the plurality of detection electrodes Rx and the shield electrode SH when the finger proximity detection process performed as the standby mode is performed, power consumption in the standby mode can be reduced more than that in the technique in the Patent Document 1 described above.

As described above, preferably, the detection unit SE supplies the voltage V12 to the gate electrode of each of the plurality of transistors Td, and supplies the voltage V2 to the gate electrode of each of the plurality of switching elements GSW and the plurality of switching elements SSW1. Then, in the state where each of the plurality of detection electrodes Rx, the plurality of scan lines GL, and the plurality of signal lines SL is in an electrically floating state, step S11 is performed. Thus, of parasitic capacitances of the shield electrode SH, a parasitic capacitance of the shield electrode SH obtained via the plurality of detection electrodes Rx, the plurality of scan lines GL and the plurality of signal lines SL can be reduced. Therefore, detection accuracy when step S11 is performed can be improved, and power consumption when step S11 is performed can be reduced.

<First Modification Example of First Embodiment>

Figure 24:
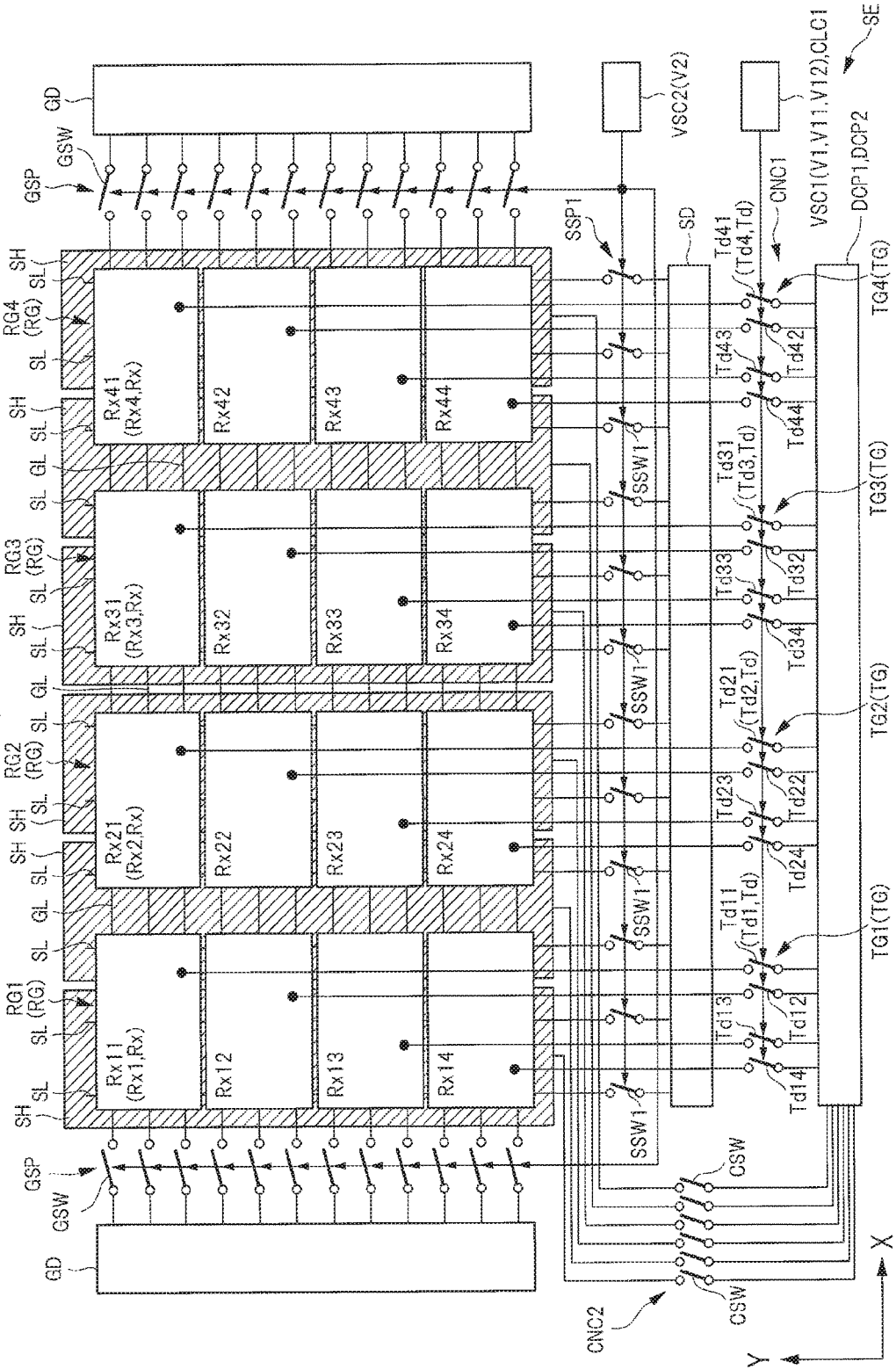
FIG. 24 is a diagram illustrating a touch detection circuit in a first modification example of the display device according to the first embodiment.

Next, a first modification example of the first embodiment will be described. FIG. 24 is a diagram illustrating a touch detection circuit in the first modification example of the display device according to the first embodiment. Note that FIG. 24 illustrates a case where each of a plurality of shield electrodes SH is selected in step S11 by hatching the plurality of shield electrodes SH.

The display device according to the present first modification example is different from the display device according to the first embodiment in that a shield electrode is divided into the plurality of shield electrodes SH, and the display device according to the present first modification example is similar to the display device according to the first embodiment for the rest. That is, the display device according to the first embodiment includes one shield electrode SH; however, the display device according to the first modification example includes the plurality of shield electrodes SH. The plurality of shield electrodes SH extend in the Y-axis direction and are arrayed in the X-axis direction when seen in a plan view.

Note that the direction in which each of the plurality of shield electrodes SH extends when seen in a plan view is not limited to the Y-axis direction and may also be any direction other than the Y-axis direction, for example, the X-axis direction. In addition, the direction in which the plurality of shield electrodes SH are arrayed may be any direction as long as the direction intersects with the direction in which each of the plurality of shield electrodes SH extends, and may be any direction other than the X-axis direction, for example, the Y-axis direction.

In the present first modification example, a connection circuit CNC2 includes a plurality of switching elements CSW as field effect transistors. Each of the plurality of switching elements CSW connects each of the plurality of shield electrodes SH to a detection circuit DCP2. Note that, although illustration is omitted in FIG. 24, the connection circuit CNC2 may switchably connect the shield electrode SH to the detection circuit DCP2 or a guard signal supply circuit GSC1 (see FIG. 16).

In the present first modification example, in step S11 included in step S1 as a finger proximity detection process, a detection unit SE connects each of the plurality of shield electrodes SH to the detection circuit DCP2 by the connection circuit CNC2. Then, in step S11, the detection unit SE detects proximity or contact of an object by detecting a change in the electrostatic capacitance of each of the plurality of shield electrodes SH. That is, in step S11, based on a change in the electrostatic capacitance of each of the plurality of shield electrodes SH, proximity or contact of an object to a front surface FS from a first side (an upper side in FIG. 3) is detected.

Therefore, in the present first modification example, in step S11, it is possible to identify which shield electrode SH of the plurality of shield electrodes SH has a change in electrostatic capacitance. Therefore, in step S21 included in step S2 as a finger coordinate detection process, it is also possible to detect only a change in electrostatic capacitance of each of a plurality of detection electrodes Rx overlapping the identified shield electrode SH. Thus, in the finger coordinate detection process as a detection mode, it is possible to further shorten the time taken for the detection process, further reduce power consumption than in the first embodiment, and prevent or suppress occurrence of a detection error.

<Second Modification Example of First Embodiment>

Figure 25:
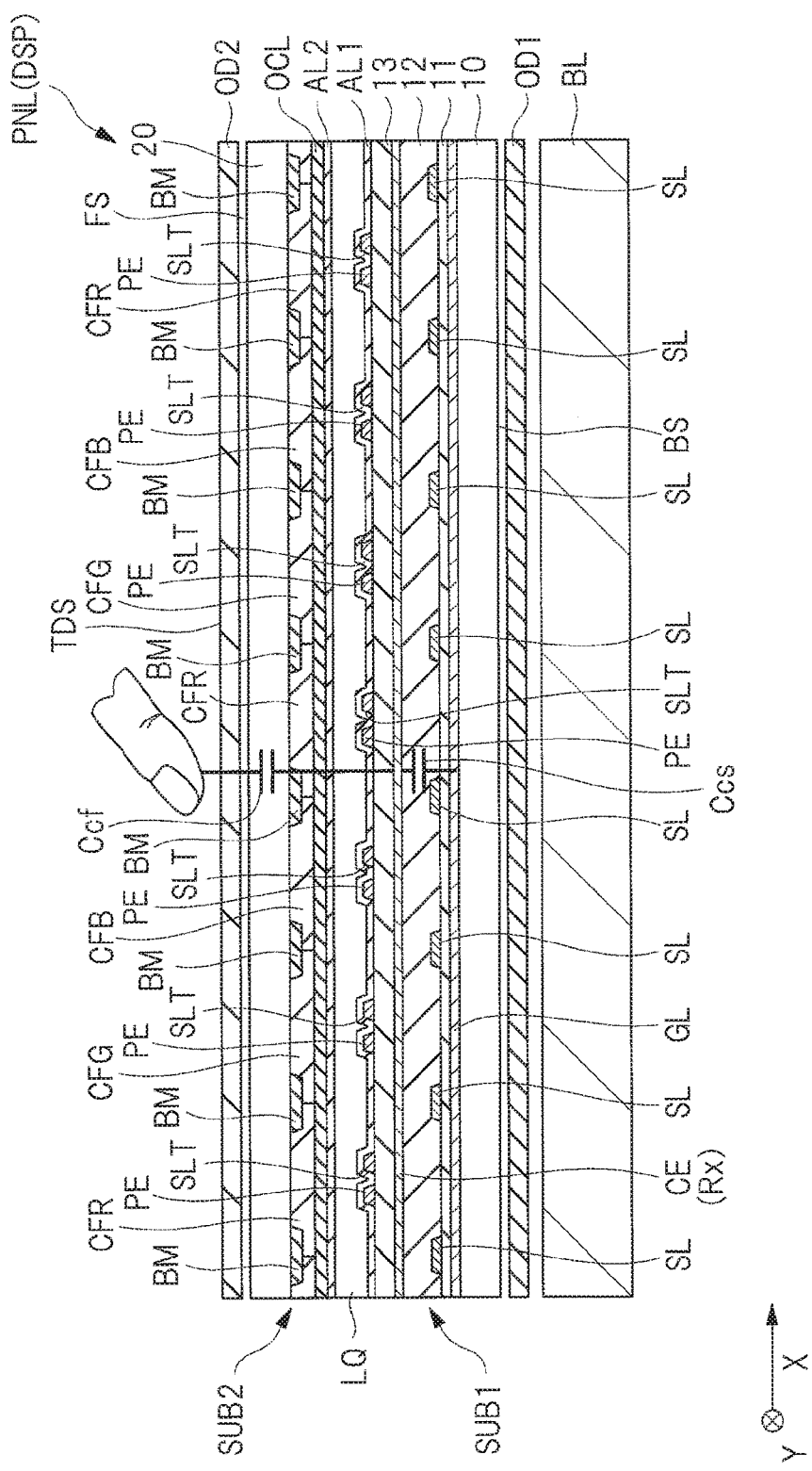
FIG. 25 is a cross-sectional view illustrating an example of a second modification example of the display device according to the first embodiment.
Figure 26:
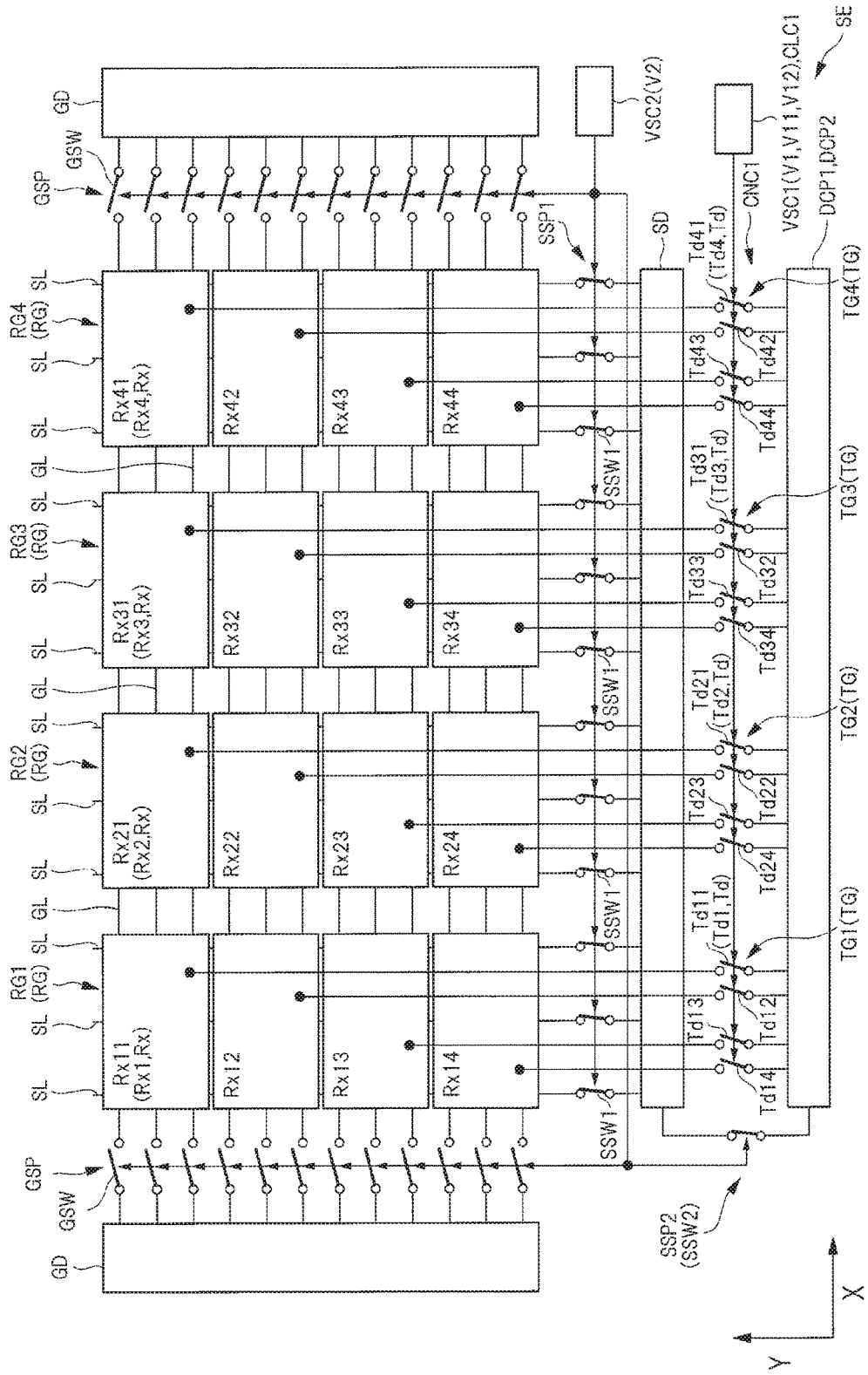
FIG. 26 is a diagram illustrating a touch detection circuit in another example of the second modification example of the display device according to the first embodiment.

Next, a second modification example of the first embodiment will be described. FIG. 25 is a cross-sectional view illustrating an example of the second modification example of the display device according to the first embodiment. FIG. 26 is a diagram illustrating a touch detection circuit in another example of the second modification example of the display device according to the first embodiment.

The display device according to the present second modification example is different from the display device according to the first modification example of the first embodiment in that a plurality of shield electrodes SH (see FIG. 24) and a connection circuit CNC2 (see FIG. 24) are not provided and a change in electrostatic capacitance of each of a plurality of scan lines GL or a plurality of signal lines SL instead of a plurality of shield electrodes SH is detected in step S11. As for the rest, the display device according to the present second modification example is similar to the display device according to the first modification example of the first embodiment.

FIG. 25 illustrates an example of detecting a change in the electrostatic capacitance of each of the plurality of scan lines GL in step S11. FIG. 26 illustrates an example of detecting a change in the electrostatic capacitance of each of the plurality of signal lines SL in step S11. Hereinafter, the example of detecting a change in the electrostatic capacitance of each of the plurality of signal lines SL will be described; however, a case of detecting the electrostatic capacitance of each of the plurality of scan lines GL can also be performed in the same manner.

In the example illustrated in FIG. 26, the display device includes a switching unit SSP2, in addition to a switching unit SSP1 and a signal line drive circuit SD. The switching unit SSP2 switches a connection state between the detection circuit DCP2 and the signal line drive circuit SD. Therefore, the switching unit SSP1, the signal line drive circuit SD, and the switching unit SSP2 switch the connection state between the detection circuit DCP2 and the plurality of signal lines SL.

The switching unit SSP2 includes a switching element SSW2 as a field effect transistor. The switching element SSW2 connects the signal line drive circuit SD to the detection circuit DCP2. The switching element SSW2 includes a gate electrode, and an output of a voltage supply circuit VSC2 is input to the gate electrode of the switching element SSW2. The switching element SSW2 is turned on when a voltage V2 is input to the gate electrode.

FIG. 26 exemplifies a case in which the switching unit SSP2 includes one switching element SSW2. However, the switching unit SSP2 may include a plurality of switching elements SSW2. Each of the plurality of switching elements SSW2 connects each of the plurality of signal lines SL to the detection circuit DCP2, each of the plurality of signal lines SL being connected to the signal line drive circuit SD by each of a plurality of switching elements SSW1.

In contrast, different from the first embodiment, the switching element SSW1 is turned on when the voltage V2 is input to the gate electrode.

In the example illustrated in FIG. 26, in step S11 included in step S1 as a finger proximity detection process, a detection unit SE supplies the voltage V2 by the voltage supply circuit VSC2, and connects each of the plurality of signal lines SL to the detection circuit DCP2 by the switching unit SSP1, the signal line drive circuit SD, and the switching unit SSP2. Then, in step S11, the detection unit SE detects proximity or contact of an object by detecting a change in the electrostatic capacitance of each of the plurality of signal lines SL. That is, in step S11, based on a change in the electrostatic capacitance of each of the plurality of signal lines SL, proximity or contact of an object to a front surface FS from a first side (for example, an upper side in FIG. 25) is detected.

In this case, in step S11, the detection unit SE supplies the voltage V2 by the voltage supply circuit VSC2 and supplies a voltage V12 as a voltage V1 by a voltage supply circuit VSC1. Thus, each of a plurality of detection electrodes Rx is cut off from the detection circuit DCP1 and brought into an electrically floating state, and each of the plurality of scan lines GL is electrically cut off from a scan line drive circuit GD and brought into an electrically floating state. In contrast, as described above, each of the plurality of signal lines SL is connected to the signal line drive circuit SD.

Therefore, in the same manner as in the first modification example of the first embodiment, also in the present second modification example, in step S11, it is possible to identify which signal line SL among the plurality of signal lines SL has a change in electrostatic capacitance. Therefore, in step S21 included in step S2 as a finger coordinate detection process, it is also possible to detect only a change in the electrostatic capacitance of each of the plurality of detection electrodes Rx overlapping the identified signal line SL when seen in a plan view. Thus, in the finger coordinate detection process as a detection mode, it is possible to further shorten the time taken for the detection process, further reduce power consumption than in the first embodiment, and prevent or suppress occurrence of a detection error.

In addition, different from the first embodiment and the first modification example of the first embodiment, in the present second modification example, since it is not necessary to form a shield electrode SH, the configuration of the display device can be made simple.

Note that the detection unit SE can be configured to detect a change in the electrostatic capacitance of each of the plurality of scan lines GL and the plurality of signal lines SL in step S11.

<Third Modification Example in First Embodiment>

Next, a third modification example in the first embodiment will be described. FIG. 27 is a cross-sectional view illustrating an example of the third modification example of the display device according to the first embodiment.

The display device according to the present third modification example is different from the display device according to the first embodiment in that a space is provided between a substrate SUB1 and a shield electrode SH, and the display device according to the present third modification example is similar to the display device according to the first embodiment for the rest. That is, in the display device according to the first embodiment, a space SP is not provided between the substrate SUB1 and the shield electrode SH; however, in the display device according to the present third modification example, the space SP is provided between the substrate SUB1 and the shield electrode SH.

Figure 27:
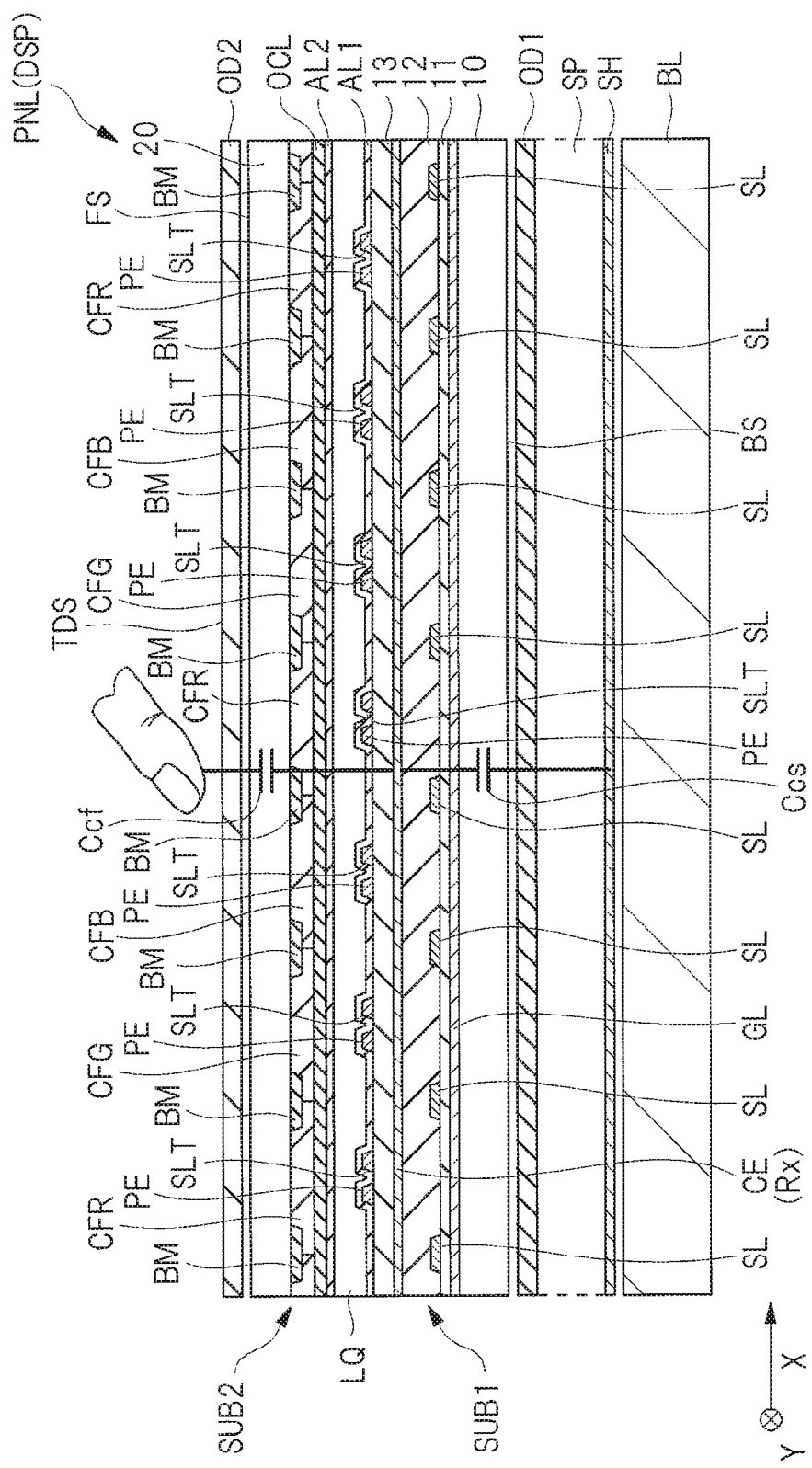
FIG. 27 is a cross-sectional view illustrating an example of a third modification example of the display device according to the first embodiment.

In the example illustrated in FIG. 27, an optical element OD1 is arranged between an insulating substrate 10 and a backlight unit BL. In addition, the shield electrode SH is arranged between the optical element OD1 and the backlight unit BL. The space SP is provided between the optical element OD1 and the shield electrode SH.

In the present third modification example, in the same manner as in the first embodiment, in step S11 (see FIG. 15) included in step S1 as a finger proximity detection process, a detection unit SE (see FIG. 16) connects the shield electrode SH to a detection circuit DCP2 (see FIG. 16) by a connection circuit CNC2 (see FIG. 16). Then, in step S11, the detection unit SE detects proximity or contact of an object by detecting a change in electrostatic capacitance of the shield electrode SH. That is, based on a change in the electrostatic capacitance of the shield electrode SH, proximity or contact of an object is detected.

Therefore, in the present third modification example, in the same manner as in the first embodiment, it is possible to shorten the time taken for the detection process, reduce power consumption, and prevent or suppress occurrence of a detection error in the finger proximity detection process performed as a standby mode.

In contrast, in a case in which the space SP is provided between the substrate SUB1 and the shield electrode SH, an object such as a finger is brought into contact with a touch detection surface TDS, and the substrate SUB1 warps. Then, depending on a change in distance between the shield electrode SH and another conductive member other than the shield electrode SH, for example, an object such as a finger, each of a plurality of detection electrodes Rx, or the like, capacitors Ccs and Ccf change. Therefore, the shield electrode SH can also be used as a pressure sensor.

<Fourth Modification Example in First Embodiment>

Figure 28:
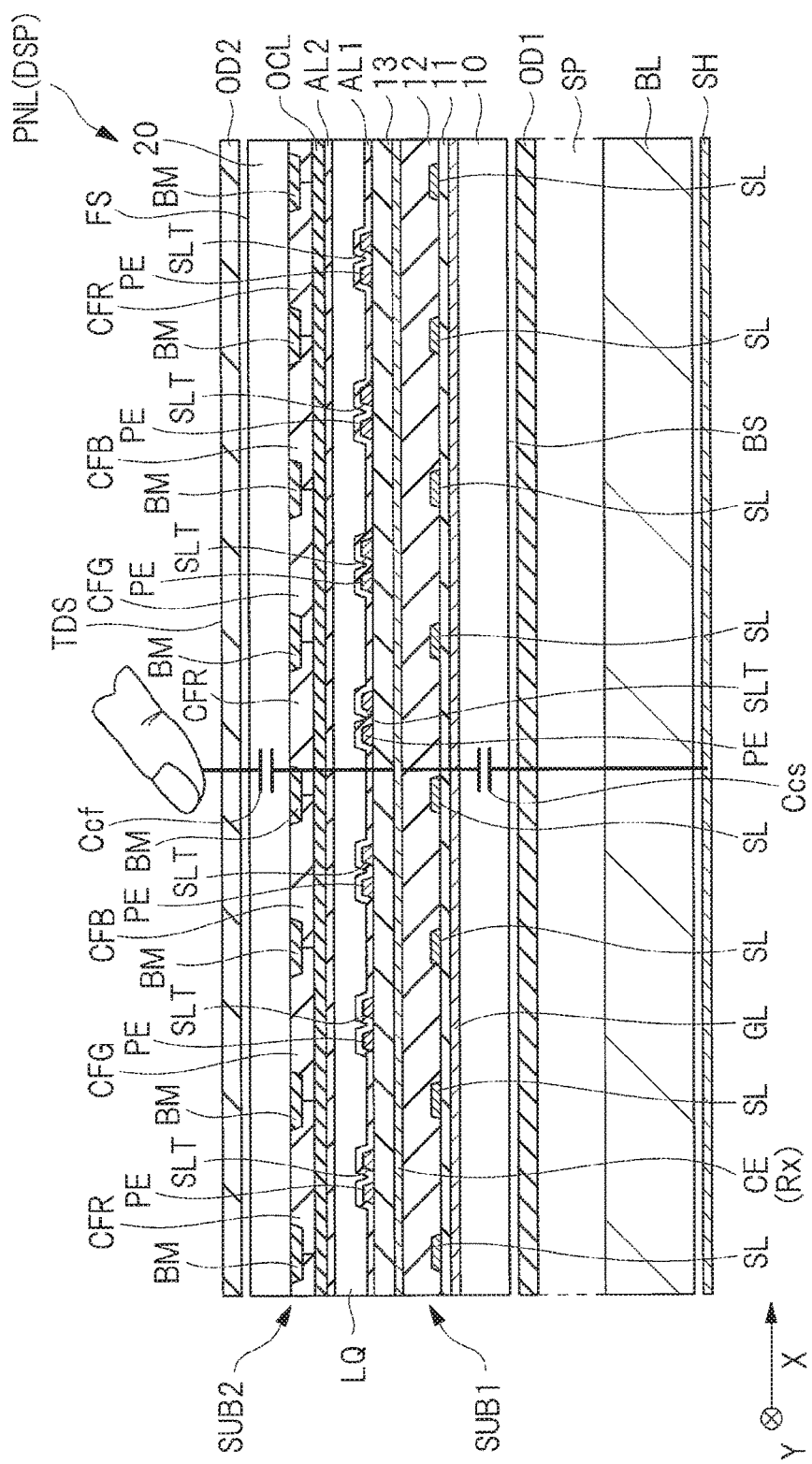
FIG. 28 is a cross-sectional view illustrating an example of a fourth modification example of the display device according to the first embodiment.

Next, a fourth modification example in the first embodiment will be described. FIG. 28 is a cross-sectional view illustrating an example of the fourth modification example of the display device according to the first embodiment.

The display device according to the present fourth modification example is different from the display device according to the third modification example of the first embodiment in that a backlight unit BL is provided between an optical element OD1 and a shield electrode SH, and the display device according to the present fourth modification example is similar to the display device according to the third modification example of the first embodiment for the rest. That is, in the display device of the third modification example of the first embodiment, the shield electrode SH is provided between the optical element OD1 and the backlight unit BL; however, in the display device according to the present fourth modification example, the backlight unit BL is provided between the optical element OD1 and the shield electrode SH.

Also in the example illustrated in FIG. 28, in the same manner as in the example illustrated in FIG. 27, a space SP is provided between a substrate SUB1 and the shield electrode SH. In addition, also in the example illustrated in FIG. 28, in the same manner as in the example illustrated in FIG. 27, the optical element OD1 is arranged between an insulating substrate 10 and the backlight unit BL.

In contrast, different from the example illustrated in FIG. 27, in the example illustrated in FIG. 28, the shield electrode SH is arranged on the side opposite to the optical element OD1 with the backlight unit BL interposed therebetween. Therefore, the backlight unit BL is arranged between the optical element OD1 and the shield electrode SH. In addition, the space SP is arranged between the optical element OD1 and the backlight unit BL.

Also in the present fourth modification example, in the same manner as in the third modification example of the first embodiment, in step S11, a detection unit SE detects proximity or contact of an object by detecting a change in electrostatic capacitance of the shield electrode SH. Therefore, also in the present fourth modification example, in the same manner as in the third modification example of the first embodiment, in a finger proximity detection process as a standby mode, it is possible to shorten the time taken for the detection process, reduce power consumption, and prevent or suppress occurrence of a detection error. In addition, also in the present fourth modification example, in the same manner as in the third modification example of the first embodiment, the shield electrode SH can also be used as a pressure sensor.

In contrast, in the present fourth modification example, since the shield electrode SH is arranged on the side opposite to the optical element OD1 with the backlight unit BL interposed therebetween, the shield electrode SH is not necessarily transparent with respect to visible light. Therefore, instead of a transparent conductive material such as ITO or IZO, a conductive material which is opaque with respect to visible light but has higher electric conductivity such as aluminum (Al) can be used as a material of the shield electrode SH. In such a case, in comparison with a case of using a transparent conductive material as a material of the shield electrode SH, it is possible to further improve the detection accuracy when step S11 is performed, and to further reduce power consumption when step S11 is performed.

(Second Embodiment)

In the first embodiment, a description has been given of the example in which the touch panel as the input device is applied to the display device with the in-cell touch detection function where the detection electrode of the input device is provided in the display panel of the display device and functions as the common electrode of the display device. In contrast, in a second embodiment, a description will be given of an example in which a touch panel as an input device is applied to a display device with an on-cell touch detection function where the touch panel is externally attached to the display surface of the liquid crystal display device and therefore a detection electrode of the input device is not provided in a display panel of the display device and does not function even as a common electrode of the display device. Note that the input device provided with the display device of the present second embodiment can be externally attached to the display surface of various types of display devices such as a liquid crystal display device and an organic EL (electroluminescence) display device.

<Display Device>

Figure 29:
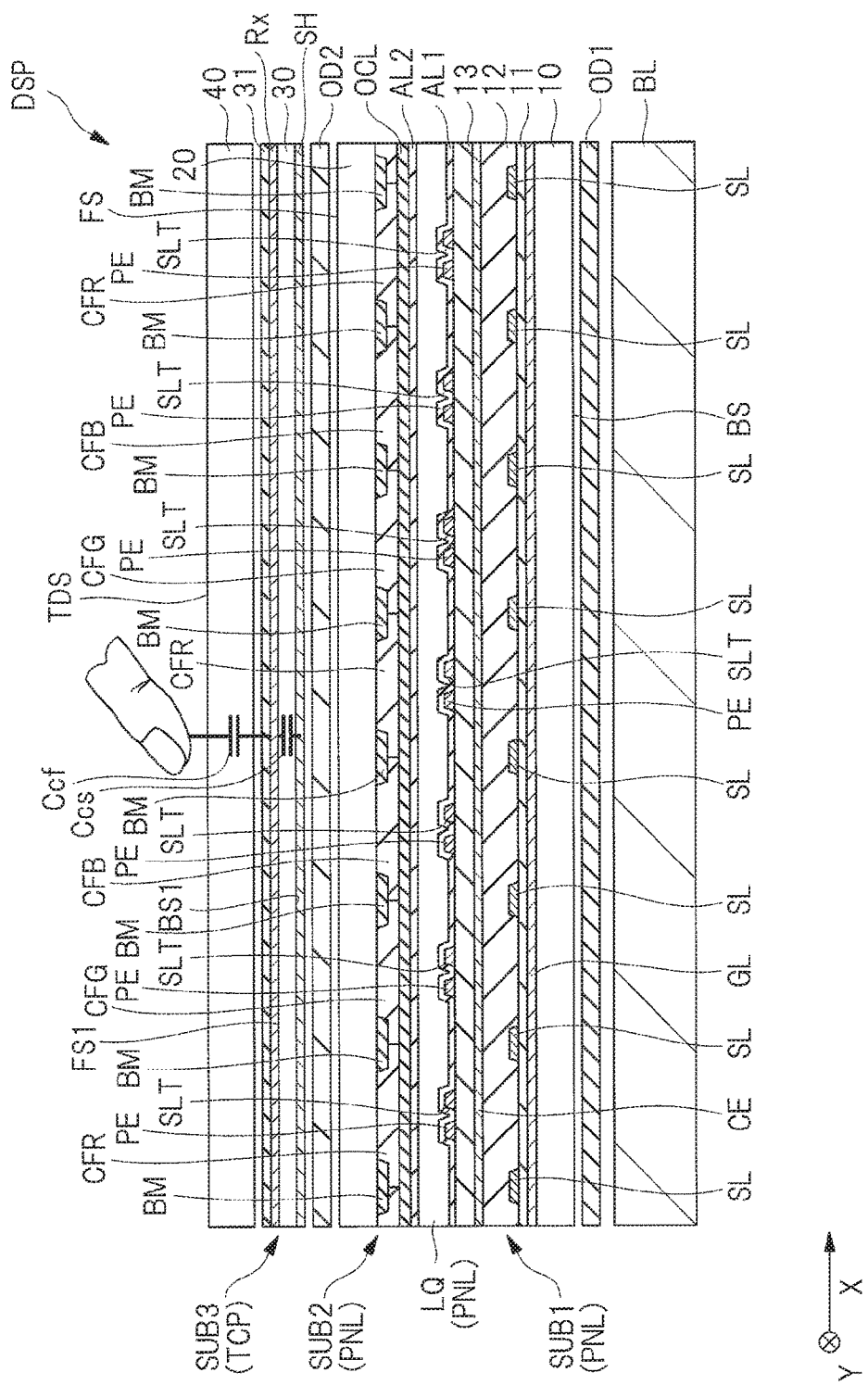
FIG. 29 is a cross-sectional view illustrating a display device according to a second embodiment.

FIG. 29 is a cross-sectional view illustrating the display device according to the second embodiment. As illustrated in FIG. 29, the display device DSP includes an input device TCP. The input device TCP is arranged on a first side (on an upper side in FIG. 29) with respect to the display panel PNL. In other words, the input device TCP is arranged so as to face a front surface FS of the display panel PNL. Note that the display device DSP may include a cover plate 40 arranged on the side opposite to the display panel PNL side with respect to the input device TCP. As the cover plate 40, an insulating substrate having a light transmitting property, such as a glass substrate or a resin substrate, can be used. In addition, a touch detection surface TDS is a surface of the cover plate 40 and is a surface on the side opposite to the side of the substrate SUB2.

In the example illustrated in FIG. 29, the input device TCP includes a substrate SUB3. The substrate SUB3 includes an insulating substrate 30 having a light transmitting property, such as a glass substrate or a resin substrate. The insulating substrate 30 includes a front surface FS1 on the first side (on the upper side in FIG. 29), and a back surface BS1 on a side (on a lower side in FIG. 29) opposite to the first side and is arranged on the first side (on the upper side in FIG. 29) with respect to the display panel PNL. In other words, the insulating substrate 30 is arranged so as to face the front surface FS of the display panel PNL.

In addition, the substrate SUB3 includes a plurality of detection electrodes Rx and an insulating film 31 on the side of the front surface FS1 with respect to the insulating substrate 30. That is, the plurality of detection electrodes Rx are arranged on the first side (on the upper side in FIG. 29) with respect to the insulating substrate 30. In other words, the plurality of detection electrodes Rx are arranged on the side opposite to the display panel PNL with the insulating substrate 30 interposed therebetween. The plurality of detection electrodes Rx overlap the insulating substrate 30 when seen in a plan view. Each of the plurality of detection electrodes Rx is made of a transparent conductive material such as ITO or IZO. The insulating film 31 is arranged on the detection electrodes Rx and the insulating substrate 30. Note that, in FIG. 29, only one detection electrode Rx among the plurality of detection electrodes Rx is illustrated.

In addition, the substrate SUB3 includes a shield electrode SH on the side of the back surface BS1 with respect to the insulating substrate 30. The shield electrode SH overlaps the display panel PNL when seen in a plan view. That is, the shield electrode SH overlaps the insulating substrate 30 when seen in a plan view. The shield electrode SH is arranged on the side (on the lower side in FIG. 29) opposite to the first side with respect to the plurality of detection electrodes Rx. In other words, the shield electrode SH is arranged on the side of the display panel PNL with respect to the plurality of the detection electrodes Rx. The shield electrode SH is made of a transparent conductive material such as ITO or IZO.

The shield electrode SH is arranged between the insulating substrate 30 and the display panel PNL. Therefore, it is possible to prevent or suppress an influence caused by an object brought in proximity to or into contact with the display panel PNL from the side of the back surface BS on a change in electrostatic capacitance of each of the plurality of detection electrodes Rx. That is, the shield electrode SH can shield each of the plurality of detection electrodes Rx from a change in the electric field caused by an object brought in proximity to or into contact with the display panel PNL from the side of the back surface BS.

In addition, although detailed illustration is omitted in FIG. 29, the input device TCP can be configured in the same manner as the display device according to the first embodiment except that the input device TCP does not include portions having a display function in the display device DSP such as a scan line drive circuit GD (see FIG. 16), a signal line drive circuit SD (see FIG. 16), a scan line GL, a signal line SL, and switching units GSP and SSP1 (see FIG. 16).

Therefore, similarly to the display device according to the first embodiment, in the display device according to the present second embodiment, the input device TCP includes a detection unit SE (see FIG. 16), and the detection unit SE includes detection circuits DCP1 and DCP2 (see FIG. 16), and connection circuits CNC1 and CNC2 (see FIG. 16). In addition, the connection circuit CNC1 switchably connects each of the plurality of detection electrodes Rx to the detection circuit DCP1, and the connection circuit CNC2 switchably connects the shield electrode SH to the detection circuit DCP2. In addition, arrangement of the plurality of detection electrodes Rx and a configuration in which the plurality of detection electrodes Rx are connected to the detection circuit DCP1 by the connection circuit CNC1 and the shield electrode SH is connected to the detection circuit DCP2 by the connection circuit CNC2 can be configured in the same manner as those in the first embodiment described with reference to FIG. 16. Therefore, when viewed from the direction perpendicular to the substrate SUB3, that is, when seen in a plan view, the plurality of detection electrodes Rx are arranged in a matrix on the substrate SUB3. In addition, the detection unit SE detects electrostatic capacitance of each of the plurality of detection electrodes Rx.

In contrast, in the display panel PNL in the display device according to the present second embodiment, a common electrode CE has a display function but does not have a touch detection function, and the plurality of detection electrodes Rx and the shield electrode SH are not provided inside the display panel PNL.

Note that, in the same manner as in the first modification example of the first embodiment described with reference to FIG. 24, a plurality of shield electrodes SH may be provided. Alternatively, in the same manner as in the second modification example of the first embodiment described with reference to FIGS. 25 and 26, instead of the plurality of shield electrodes SH, a plurality of scan lines GL or a plurality of signal lines SL may be connected to the detection circuit DCP2. Alternatively, in the same manner as in the third modification example of the first embodiment described with reference to FIG. 27 and in the fourth modification example of the first embodiment described with reference to FIG. 28, the space SP (see FIGS. 27 and 28) may be provided between the shield electrode SH and the substrate SUB1, that is, between the shield electrode SH and the insulating substrate 10.

The input device provided in the display device according to the present second embodiment includes: an insulating substrate 30 including a front surface FS1 on the first side (on the upper side in FIG. 29), and a back surface BS1 on the side (on the lower side in FIG. 29) opposite to the first side; the plurality of detection electrodes Rx overlapping the insulating substrate 30 when seen in a plan view; and the shield electrode SH overlapping the insulating substrate 30 when seen in a plan view. The shield electrode SH is arranged on the side (on the lower side in FIG. 29) opposite to the first side with respect to the plurality of detection electrodes Rx. Based on electrostatic capacitance of the shield electrode SH, proximity or contact of an object to the front surface FS1 from the first side (the upper side in FIG. 29) is detected, and the position of the object brought in proximity to or into contact with the front surface FS1 from the first side (the upper side in FIG. 29) is detected based on the electrostatic capacitance of each of the plurality of detection electrodes Rx.

Thus, in the detection process (step S11 in FIG. 15) of detecting proximity or contact of an object to the display panel from outside, a change in the electrostatic capacitance of the shield electrode SH can be detected. Therefore, the time taken for the detection process can be shortened. In addition, since the time taken for the detection process becomes short, average power consumption in the finger proximity detection process (step S1 in FIG. 15) can be reduced even in a case in which a time interval when step S11 is repeated is short.

That is, according to the input device provided in the display device of the present second embodiment, in the same manner as in the display device of the first embodiment, in the finger proximity detection process performed as the standby mode before the finger coordinate detection process as the detection mode, it is possible to shorten the time taken for the detection process, reduce power consumption, and prevent or suppress occurrence of a detection error.

In the foregoing, the invention made by the inventor of the present invention has been concretely described based on the embodiments. However, it is needless to say that the present invention is not limited to the foregoing embodiments and various modifications and alterations can be made within the scope of the present invention.

In addition, the case of the liquid crystal display device has been exemplified as the disclosed example in the above-described embodiment, but other application examples may include various types of flat panel display devices such as an organic EL display device, other self-luminous display devices, and an electronic paper display device including an electrophoretic element. In addition, it is needless to say that the invention can be applied to a small size to a large size without being particularly limited.

Various modifications and alterations can be conceived by those skilled in the art within the spirit of the present invention, and it is understood that such modifications and alterations are also encompassed within the scope of the present invention.

For example, those skilled in the art can suitably modify the above-described embodiment by addition, deletion, or design change of components, or by addition, omission, or condition change of steps. Such modifications are also encompassed within the scope of the present invention as long as they include the gist of the present invention.

The present invention is advantageous when being applied to a display device and an input device.

What is claimed is:

1. A display device comprising:
   a display pane;
   a touch detection surface;
   a plurality of first electrodes overlapping the display panel when seen in a plan view; and
   at least one second electrode overlapping the display panel when seen in a plan view,
   wherein the first electrodes are provided between the touch detection surface and the second electrode,
   wherein proximity or contact of an object to the touch detection surface is detected based on self-capacitance of the second electrode while the first electrodes do not detect proximity or contact of the object in a first mode, and
   wherein a position of the object brought in proximity to or into contact with the touch detection surface is detected based on self-capacitance of each of the plurality of first electrodes while the second electrode does not detect proximity or contact of the object in a second mode.

2. The display device according to claim 1,
   wherein the at least one second electrode includes a plurality of second electrodes,
   wherein the second electrodes extending in a first direction and arrayed in a second direction intersecting with the first direction when seen in a plan view, and
   wherein proximity or contact of the object is detected based on self-capacitance of each of the second electrodes in the first mode.

3. The display device according to claim 2,
   wherein each of the second electrodes is a scan line or a signal line.

4. The display device according to claim 1,
   wherein the plurality of first electrodes are arranged in the display panel.

5. The display device according to claim 4,
   wherein the display panel includes:
      a first substrate; and
      a second substrate provided between the touch detection surface and the first substrate, and
   wherein the first substrate is provided between the second electrode and the second substrate.

6. The display device according to claim 5,
   wherein a space is provided between the first substrate and the second electrode.

7. The display device according to claim 5,
   wherein the display panel further includes a liquid crystal layer arranged between the first substrate and the second substrate, and
   wherein the plurality of first electrodes are arranged between the first substrate and the liquid crystal layer.

8. The display device according to claim 1,
   wherein the second electrode overlaps each of the plurality of first electrodes when seen in a plan view, and
   wherein proximity or contact of the object is detected based on the self-capacitance of the second electrode in a state where each of the plurality of first electrodes is in an electrically floating state.

9. The display device according to claim 8, further comprising:
   a plurality of scan lines extending in a third direction and arrayed in a fourth direction intersecting with the third direction when seen in a plan view; and
   a plurality of signal lines extending in the fourth direction and arrayed in the third direction when seen in a plan view,
   wherein the second electrode overlaps each of the plurality of scan lines and each of the plurality of signal lines when seen in a plan view, and
   wherein proximity or contact of the object is detected based on the self-capacitance of the second electrode in a state where each of the plurality of scan lines and each of the plurality of signal lines are in an electrically floating state.

10. The display device according to claim 1, further comprising:
    a third substrate provided between the touch detection surface and the display panel, wherein the plurality of first electrodes are arranged between the third substrate and the touch detection surface, and wherein the second electrode is arranged between the third substrate and the display panel.

11. The display device according to claim 1, further comprising:

a detection unit detecting self-capacitance of each of the plurality of first electrodes and the second electrode, wherein the detection unit performs a first detection process of detecting proximity or contact of the object by detecting the self-capacitance of the second electrode, wherein the detection unit repeats the first detection process when proximity or contact of the object is not detected in the first detection process, and wherein the detection unit performs a second detection process of detecting a position of the object by individually detecting the self-capacitance of each of the plurality of first electrodes when proximity or contact of the object is detected in the first detection process.

12. The display device according to claim 11, wherein the detection unit includes:

a first detection circuit detecting the self-capacitance of each of the plurality of first electrodes;

a second detection circuit detecting the self-capacitance of the second electrode; and a switching unit switching a connection state between the first detection circuit and the plurality of first electrodes, wherein the detection unit detects the self-capacitance of the second electrode by the second detection circuit in the first detection process, wherein the detection unit individually detects the self-capacitance of each of the plurality of first electrodes by connecting the plurality of first electrodes to the first detection circuit by the switching unit in the second detection process, and wherein the detection unit performs the first detection process in a state where each of the plurality of first electrodes is brought into an electrically floating state by the switching unit.

13. An input device comprising:

a substrate;

a touch detection surface;

a plurality of first electrodes overlapping the substrate when seen in a plan view; and at least one second electrode overlapping the substrate when seen in a plan view, wherein the first electrodes are provided between the touch detection surface and the second electrode, wherein proximity or contact of an object to the touch detection surface is detected based on self-capacitance of the second electrode while the first electrodes do not detect proximity or contact of the object in a first mode, and wherein a position of the object brought in proximity to or into contact with the touch detection surface is detected based on self-capacitance of each of the plurality of first electrodes while the second electrode does not detect proximity or contact of the object in a second mode.

14. The input device according to claim 13, wherein the at least one second electrode includes a plurality of second electrodes, wherein the second electrodes extending in a first direction and arrayed in a second direction intersecting with the first direction when seen in a plan view, and wherein proximity or contact of the object is detected based on self-capacitance of each of the second electrodes in the first mode.

15. The input device according to claim 13, wherein the second electrode overlaps each of the plurality of first electrodes when seen in a plan view, and wherein proximity or contact of the object is detected based on the self-capacitance of the second electrode in a state where each of the plurality of first electrodes is in an electrically floating state.

16. The input device according to claim 13, further comprising:

a detection unit detecting self-capacitance of each of the plurality of first electrodes and the second electrode, wherein the detection unit performs a first detection process of detecting proximity or contact of the object by detecting the self-capacitance of the second electrode, wherein the detection unit repeats the first detection process when proximity or contact of the object is not detected in the first detection process, and wherein the detection unit performs a second detection process of detecting a position of the object by individually detecting the self-capacitance of each of the plurality of first electrodes when proximity or contact of the object is detected in the first detection process.

17. The input device according to claim 16, wherein the detection unit includes:

a first detection circuit detecting the self-capacitance of each of the plurality of first electrodes;

a second detection circuit detecting the self-capacitance of the second electrode; and a switching unit switching a connection state between the first detection circuit and the plurality of first electrodes, wherein the detection unit detects the self-capacitance of the second electrode by the second detection circuit in the first detection process, wherein the detection unit individually detects the self-capacitance of each of the plurality of first electrodes by connecting the plurality of first electrodes to the first detection circuit by the switching unit in the second detection process, and wherein the detection unit performs the first detection process in a state where each of the plurality of first electrodes is brought into an electrically floating state by the switching unit.

18. An input device comprising:

a substrate;

a touch detection surface;

a plurality of first electrodes overlapping the substrate when seen in a plan view; and at least one second electrode overlapping the substrate when seen in a plan view, wherein the first electrodes are provided between the touch detection surface and the second electrode, wherein a first driving signal is supplied to each of the first electrodes from a detection circuit, wherein a second driving signal is supplied to the second electrode from the detection circuit, wherein proximity or contact of an object to the touch detection surface is detected from the second electrode on a basis of electrostatic capacitance of the second electrode in a first mode, and wherein a position of the object brought in proximity to or into contact with the touch detection surface is detected from the first electrodes on a basis of electrostatic capacitance of each of the first electrodes in a second mode.

19. The input device according to claim 18, further comprising:
    first wires each located between the detection circuit and each of the first electrodes; and
    a second wire located between the detection circuit and the second electrode,
    wherein the first driving signal is directly supplied to each of the first electrodes from each of the first wires, and
    wherein the second driving signal is directly supplied to the second electrode from the second wire.

20. The input device according to claim 18,
    wherein the first electrodes do not detect proximity or contact of the object in the first mode, and
    wherein the second electrode does not detect proximity or contact of the object in the second mode.

* * * * *